(12) United States Patent
Yuan et al.

(10) Patent No.: US 7,684,892 B2
(45) Date of Patent: Mar. 23, 2010

(54) PROCESS FOR GENERATING CONTROL SEQUENCE OF OPERATIONS

(75) Inventors: Chengyin Yuan, Rochester Hills, MI (US); Fangming Gu, Rochester Hills, MI (US); Stephan R. Biller, Birmingham, MI (US); Richard C. Immers, Rochester Hills, MI (US); Chieh-Yi Jerry Yen, Rochester Hills, MI (US); Magnus Johansson, Gothenburg (SE); Mikael Kjellgren, Gothenburg (SE); Bengt Erik Lennartson, Gothenburg (SE)

(73) Assignees: GM Global Technology Operations, Inc., Detroit, MI (US); Chalmers University of Technology, Gothenburg (SE)

( * ) Notice: Subject to any disclaimer, the term of this patent is extended or adjusted under 35 U.S.C. 154(b) by 203 days.

(21) Appl. No.: 11/928,542

(22) Filed: Oct. 30, 2007

(65) Prior Publication Data
US 2009/0112350 A1  Apr. 30, 2009

(51) Int. Cl.
*G06F 19/00* (2006.01)
*G05B 11/01* (2006.01)
*G05B 13/02* (2006.01)
*G05B 19/42* (2006.01)
*G06F 9/44* (2006.01)

(52) U.S. Cl. ............... 700/181; 700/18; 700/28; 700/86; 700/173; 700/253; 717/10; 717/104; 717/106

(58) Field of Classification Search ............ 700/18, 700/28, 86–87, 95, 100, 104–105, 173, 181, 700/253; 717/100, 104, 106
See application file for complete search history.

(56) References Cited

U.S. PATENT DOCUMENTS

| | | | | |
|---|---|---|---|---|
| 4,928,221 | A * | 5/1990 | Belkhiter | 700/86 |
| 5,805,452 | A * | 9/1998 | Anthony et al. | 700/142 |
| 6,112,133 | A * | 8/2000 | Fishman | 700/182 |
| 6,367,052 | B1 * | 4/2002 | Steinberg et al. | 716/2 |
| 6,618,682 | B2 * | 9/2003 | Bulaga et al. | 702/84 |
| 7,143,367 | B2 * | 11/2006 | Eng | 716/2 |
| 7,228,196 | B2 * | 6/2007 | Dai et al. | 700/173 |
| 7,337,439 | B1 * | 2/2008 | Johnson et al. | 717/161 |
| 2002/0155628 | A1 * | 10/2002 | Bulaga et al. | 438/14 |
| 2006/0053396 | A1 * | 3/2006 | Eng | 716/7 |
| 2009/0083724 | A1 * | 3/2009 | Eichenberger et al. | 717/160 |

* cited by examiner

*Primary Examiner*—Ramesh B Patel

(57) ABSTRACT

A method for generation of a control code set for a manufacturing process includes generating a list of sequences of operations with an automatic sequence of operations generator, selecting an optimized sequence of operations from the list of sequences of operations, and utilizing the optimized sequence of operations to generate the control code set.

19 Claims, 15 Drawing Sheets

US 7,684,892 B2

PROCESS FOR GENERATING CONTROL SEQUENCE OF OPERATIONS

TECHNICAL FIELD

This disclosure is related to implementing a sequence of operations for a manufacturing process.

BACKGROUND

Modern manufacturing processes can be complex and intricate. Consumer demands and world-wide competition have driven manufacturing processes to become flexible, adaptive, and cost effective. As a result, the manufacturing processes used to drive and enable production have become increasingly complex. Control logic is the set of specific commands or work instructions given to automated, semi-automated, and manual workstations in a manufacturing process. Known methods to create, implement, and maintain control logic are labor intensive. Control engineers must employ their skills and experience to manually create and edit the data required to generate control logic in order to precisely drive every permutation of the manufacturing process.

Known methods employing control engineers to manually perform the tasks required to create control logic have many drawbacks. The quality of work conducted by a control engineer is dependent upon the competency of the particular engineer. Errors in the control logic generating process can increase the occurrence of undesirable events; cause decreased production, quality, and efficiency; lower customer satisfaction; and increase warranty cost. Limited availability of a qualified engineer to perform adaptations to a manufacturing process may cause delays in implementations of changes or may become a bottleneck to product improvement processes. The labor involved in the programming activities drives up the costs of the manufacturing processes.

Manufacturing processes involving complex mechanical devices are frequently described as discrete manufacturing processes. Optimization of discrete manufacturing processes involves balancing the work assignments within the series of events included in the manufacturing process with other manufacturing concerns such that the desired end product is produced efficiently. Manufacturing concerns addressed in the optimization process include workload balance, equipment availability, operator well being, quality, cost, and throughput or the number of parts produced in a time span. Optimization involves accepting input regarding the priority of the manufacturing concern, analysis of the work to be performed, breaking that work down into the smallest workable units or work elements, and then apportioning that work into work assignments throughout the available workstations based on the priority of the manufacturing concerns. The assembled work assignments are collectively referred to as a sequence of operations. The sequence of operations dictates the task by task process by which the product is manufactured, and the control logic implements the sequence of operations into a set of enabling instructions to each workstation.

Analyzing the work to be performed in a manufacturing process is labor intensive and time consuming. Complicated products such as electronics, vehicles, airplanes, and the like may involve millions of possible interactions between part components and assembly tasks. Carrying information regarding the parts and manufacturing process forward in a compatible, useful format to later comparisons and calculations is a difficult task prone to error and highly dependent on the competency and vigilance of the engineer involved. Further, the task of prioritizing manufacturing concerns and creating a viable sequence of operations for a manufacturing process is a highly intensive and complicated endeavor. The productivity of a manufacturing facility rests heavily on the ability of the facility to implement an efficient sequence of operations. Any method streamlining and error-proofing the process of the generation of a sequence of operations quickly translates to the bottom line of a manufacturing facility.

SUMMARY

A method for generation of a control code set for a manufacturing process includes generating a list of sequences of operations with an automatic sequence of operations generator, selecting an optimized sequence of operations from the list of sequences of operations, and utilizing the optimized sequence of operations to generate the control code set.

BRIEF DESCRIPTION OF THE DRAWINGS

One or more embodiments will now be described, by way of example, with reference to the accompanying drawings, in which:

FIG. 2A is an illustration of a simple product without any alternative product options;

FIG. 2B is an illustration of a more complex product with a few alternative product options;

FIG. 2C is an illustration of a significantly more complex product with several alternative product options;

FIG. 3A is an illustration of a simple manufacturing process wherein each workstation has a single work element assigned;

FIG. 3B is an illustration of a manufacturing process wherein each workstation may have multiple work elements assigned;

FIG. 3C is an illustration of the manufacturing process of FIG. 3B wherein work elements from one station have been reassigned to other workstations;

FIG. 3D is an illustration of a manufacturing process including parallel workstations wherein each work element has been assigned in an initial sequence of operations;

FIG. 3E is an illustration of the manufacturing process of FIG. 3D wherein an alternate sequence of operations has been implemented to adjust for changing conditions in the manufacturing process;

DETAILED DESCRIPTION

Figure 1:
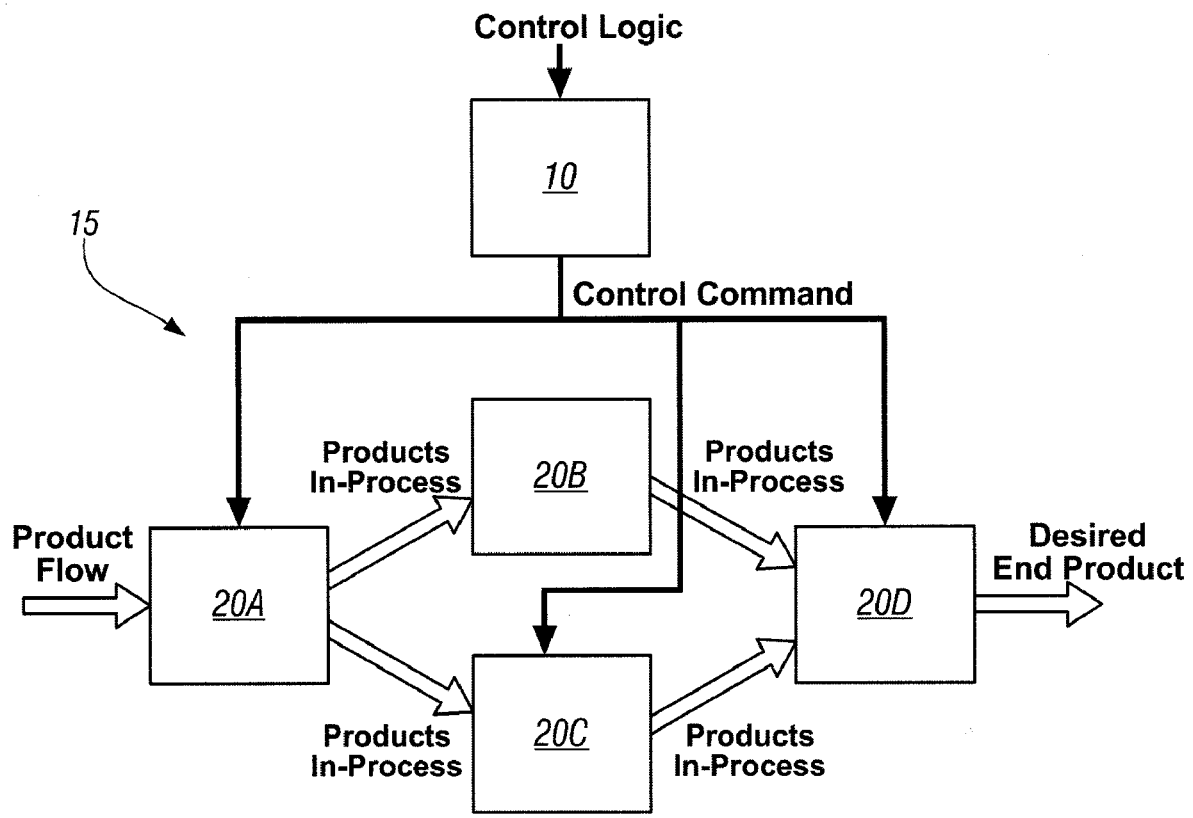
FIG. 1 is a block diagram of an exemplary embodiment of a known manufacturing line receiving instructions from a control module in accordance with the disclosure.

Referring now to the drawings, wherein the showings are for the purpose of illustrating certain exemplary embodiments only and not for the purpose of limiting the same, FIG. 1 graphically depicts a known method whereby inputs from a control engineer are utilized within a control module 10 to instruct a series of manufacturing workstations 20A, 20B, 20C, and 20D. Control module 10 may be a centralized or distributed control equipment which executes control logic inputs from a programmer and issues enabling instructions to one or more workstations 20 implementing a manufacturing process on manufacturing line 15. Control module 10 is either dedicated or general-purpose programmable equipment including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. The control module has a set of control routines, comprising resident program instructions and calibrations stored in ROM. The product flow of FIG. 1 comprises the raw materials, parts, substances, or products-in-process being put through the manufacturing process to produce the desired end product. Workstations 20 may be automated machinery, such as but not limited to robots, welding machines, conveyor systems, painting machines, and sorting devices. Workstations 20 may be semi-automated machinery, such as but not limited to operator assisted testing stations, nut-driver applications allowing an operator to drive fasteners to a specific torque range, and packaging machines generating label codes for the operator to add to the shipping package for a particular product. Workstations 20 may alternatively be manual workstations, performing assistance tasks such as but not limited to specifying a particular set of instructions to the workstation operator or checking the manually performed work at workstation for certain traits. Many embodiments of the workstations that could be applied to the present disclosure are envisioned, and are not meant to be limited to the particular embodiments named herein. Workstations 20 perform work on the product flow to generate a desired end product. The work to be done by each workstation 20 is considered a work assignment. Control module 10 issues control command based on control logic or code, input in this embodiment by a control engineer, and the status of workstations 20 to the workstations 20 in order to drive the manufacturing process. The desired end product of the manufacturing process may be a product ready for sale to a consumer, or the desired end product may be some components or products to be utilized in some further processes.

Figure 2A:
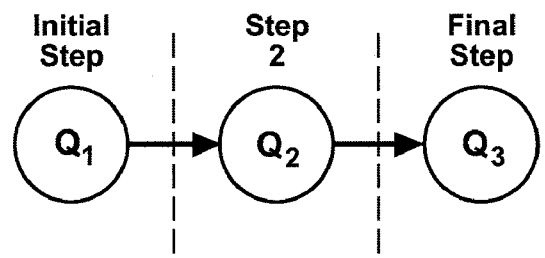
FIG. 2A-2C are flowcharts illustrating exemplary impacts that producing products with alternative product options on a single manufacturing line may create in accordance with the disclosure.
Figure 2B:
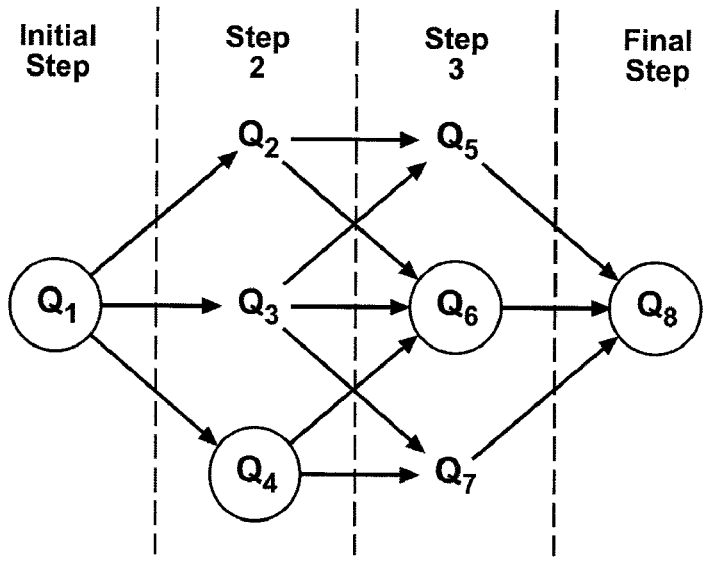
Figure 2C:
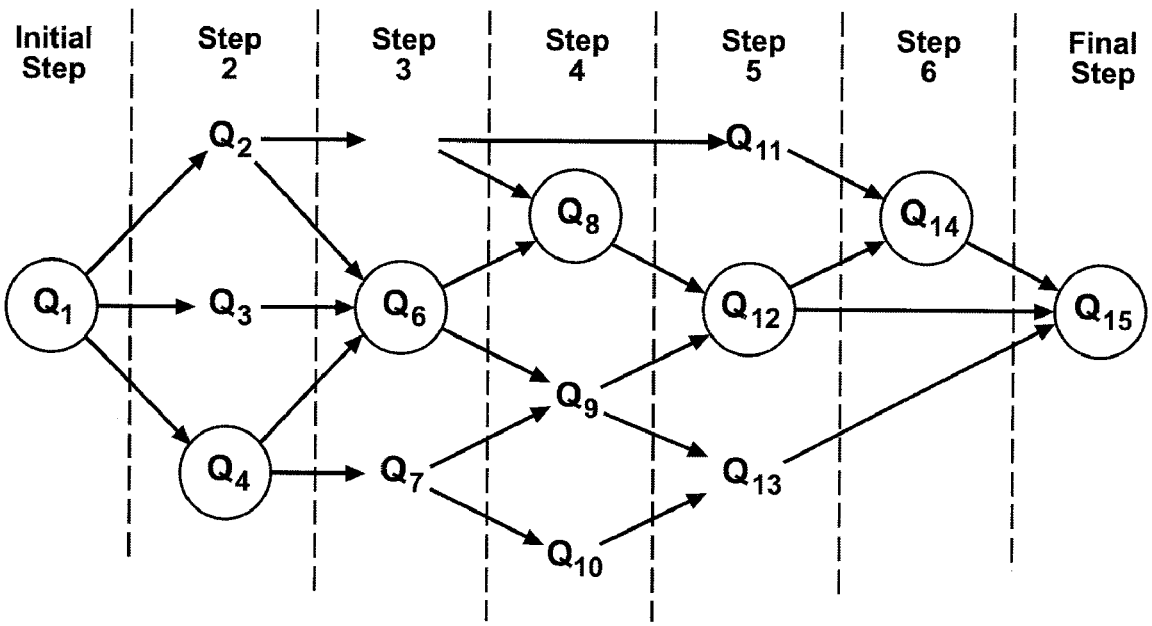

Manufacturing processes must be flexible to produce a wide variety of products, adaptive to circumstances and changes to priorities in manufacturing concerns, and cost effective in order to be competitive. In order to meet these goals, a manufacturing process must be able to accommodate different product configurations and different process configurations. FIGS. 2A through 2C illustrate how changes in product configurations may affect a manufacturing process in accordance with the present disclosure, and FIGS. 3A through 3E illustrate how changes in process configurations may affect a manufacturing process in accordance with the present disclosure.

FIGS. 2A through 2C illustrate how product produced on a given manufacturing line 15 may be required to change between various product configurations. Referencing FIG. 2A, an exemplary process flow is illustrated, wherein the product first exists in an initial step: state Q1, is altered in a manufacturing process into a step 2: state Q2, and is produced in a final step: state Q3. The circles around states Q1, Q2, and Q3 designate the product options selected for manufacture. In this case, because no product alternatives exist, all three pictured states are circled. The errors, cost, and overall complexity of implementing this simple process is limited to a single group of options, wherein the process flow results in a desired end product out. However, competition in modern manufacturing has driven manufacturers to become more flexible in the products offered to the consumer and more cost effective in response to ever decreasing margins. A manufacturing line 15 involves expensive equipment and overhead, and flexible manufacturing processes that produce a wide variety of products are highly preferable to rigid processes that produce a single product and sit idle when demand for that single product is met. As a result, a single manufacturing line 15 that in the past was dedicated to making a single product, for example a simple radio, might now be required to make alternative batches or even sequenced in-line orders of multiple products, for example simple radios, clock radios, and radios with integral compact disk players. Exemplary complex product flows are illustrated in FIGS. 2B and 2C, wherein the products undergo a series of alternate operations to produce desired end products. The end products of these illustrated processes include diverse features and may incorporate diverse manufacturing steps to produce the desired end product. FIG. 2B describes a process flow wherein the product first exists in an initial step: state Q1. The product is then altered in a manufacturing process into a step 2: states Q2, Q3, or Q4, the state depending upon the desired end product and the manufacturing process required to create the particular desired end product. The product is again altered in a manufacturing process into a step 3: states Q5, Q6, or Q7, again depending upon the desired end product and the manufacturing process required to create the particular desired end product. The product is finally produced in a final step: state Q8, the particular end product exhibiting the properties as selected in the process employed, designated by the circled states, to produce the desired end product. FIG. 2C describes a product flow of increasing complexity, wherein the product first exists in an initial step: state Q1, and is then put through a series of manufacturing processes selected from a grid of possible processes, the product going through a series of intermediate steps 2 through 6, in order to produce a desired end product: state Q15. Implementing the sequence of operations required to produce the diverse features in a complex product flow as described in FIGS. 2B and 2C greatly complicates task of configuring the requisite control logic. Each level of complexity requires increasingly large commitments to ensure that one manufacturing sequence or product feature does not interfere with another. For a desired end product with only a few intermediate steps, the complexity of adding an additional feature may be manageable. For desired end products with thousands or millions of part interactions and manufacturing steps, for example, an automobile or airplane, an automated method of integrating inputs into a sequence of operations operable to generate control logic may reduce process related costs, reduce implementation delays, and reduce the occurrence of errors in the manufacturing process.

Figure 3A:
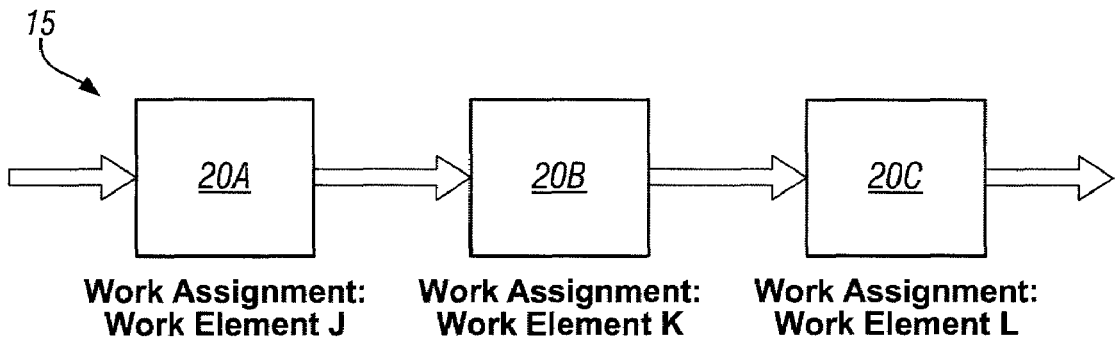
FIGS. 3A-3E are block diagrams of exemplary manufacturing lines illustrating changing work assignments within a manufacturing process in accordance with the disclosure.
Figure 3B:
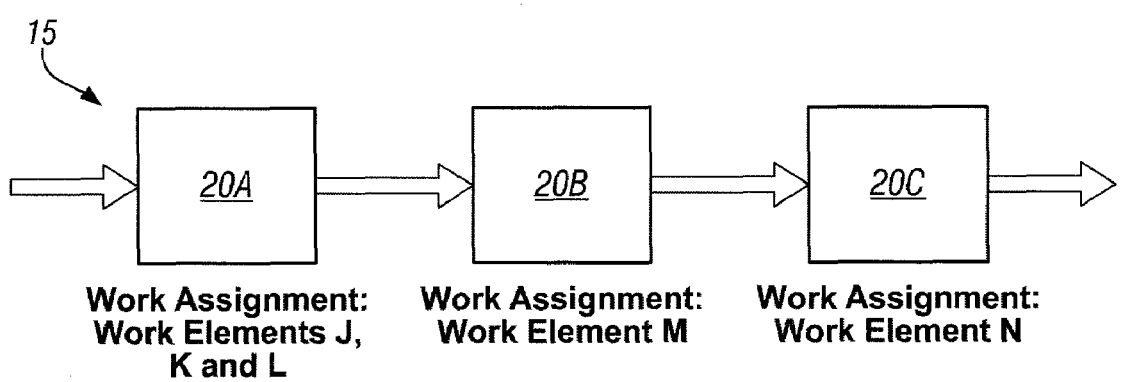
Figure 3C:
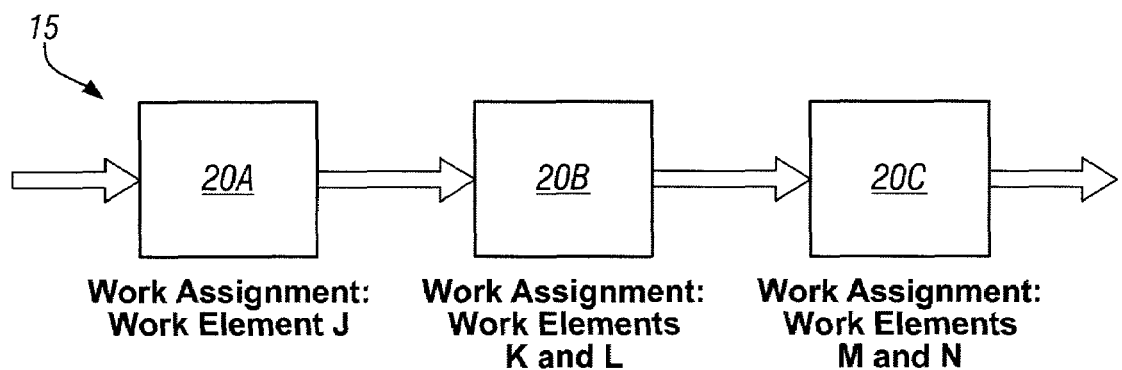
Figure 3D:
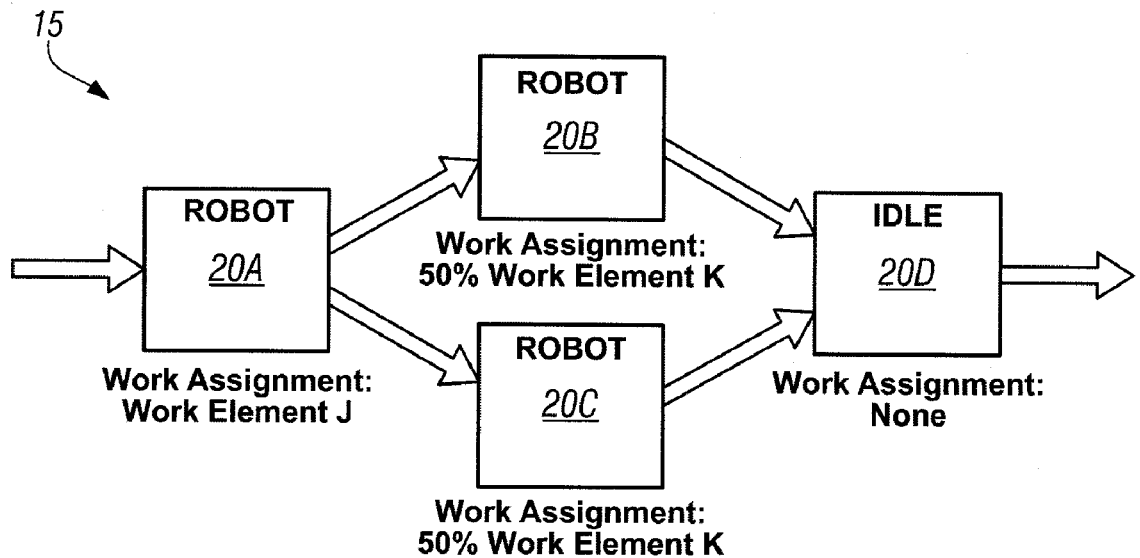
Figure 3E:
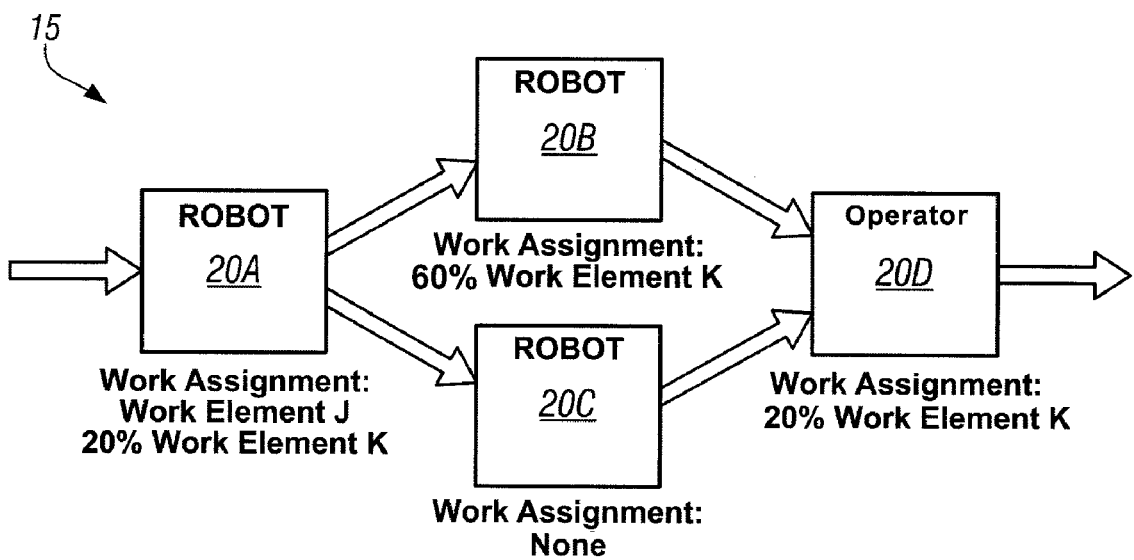

FIGS. 3A through 3E illustrate how a manufacturing process for a given manufacturing line 15 may be required to change according to different requirements. FIG. 3A describes a simple manufacturing process, wherein three workstations, 20A, 20B, and 20C, are each given work assignments with a single work element each. Workstation 20A performs work element J, workstation 20B performs work element K, and workstation 20C performs work element L. FIGS. 3B and 3C together illustrate how a redistribution of work elements between different workstations may take place. FIG. 3B describes a manufacturing process wherein an additional layer of complexity is added, in that the work assignment for station 20A has been changed to include three work elements J, K, and L. FIG. 3C describes a change to the process of FIG. 3B, wherein the sequence of operations for the 3 workstations has been adjusted, and work elements K and L, originally assigned to workstation 20A, have been redistributed to workstation 20B, and 20C will perform remaining work elements M and N. There can be many reasons for redistribution if work elements, including but not limited to changes in priority of manufacturing concerns, maintenance issues, changes in the product requirements, and experiments aimed at continuous improvement in the efficiency of the manufacturing line 15. Regardless of the motivation, work elements from one station may be reassigned to another workstation in furtherance of manufacturing objectives. FIGS. 3D and 3E together illustrate how work elements may be redistributed among various workstations in order to take advantage of underutilized capacity in the manufacturing line 15 in order to compensate for unforeseen conditions. Unforeseen conditions can take many forms. Exemplary unforeseen conditions include workstation malfunctions. Manufacturing facilities, as complex, highly automated, and mechanized centers of industry, rely heavily on machines such as motors, conveyors, testing machines, and other devices to produce a desired end product. One constant property of all machines is that given enough time, any machine will experience malfunctions or undergoing regular scheduled preventative maintenance. Additionally, most manufacturing processes depend on human interaction with the process, and the performance of an individual's work output can be variable from worker to worker and day to day. Adaptability to changing conditions in a manufacturing process can compensate for unforeseen conditions and prevent the conditions from posing unreasonable risks to the operators, slowing overall production of the manufacturing line 15, reducing quality of the product, or incurring added cost in the production process. FIG. 3D depicts a manufacturing line 15 wherein three workstations, 20A, 20B, and 20C, employing robots split work elements J and K, and one workstation, 20D, sits idle. Workstation 20A has a work assignment of work element J, and workstations 20B and 20C each perform 50% of work element K. Such a parallel work assignment as is being performed by workstations 20B and 20C is common in manufacturing processes, especially in instances where specialized tasks requiring unique tools or procedures are required to produce a certain trait not common to the entire product produced by the manufacturing line 15 or where the work assignments being done in parallel are especially involved and would constitute a bottleneck in the manufacturing process if the product flow had to wait for a single workstation to perform the task on each individual product in the process. The number of parallel workstations is not limited to two, and may include any number of parallel stations. Additionally, each parallel path through which a product might travel is not limited to a single workstation and each parallel leg might include several workstations in series. The permutations of manufacturing line 15 configurations vary from product to product and facility to facility, and the arrangement of workstations in accordance with this disclosure is not meant to be limited to the embodiments described herein. The idle workstation 20D is a free resource that is designed into the exemplary embodiment pictured in FIG. 3D for use in alternative sequences of operations; however it will be appreciated that partially utilized or underutilized workstations could equally be used as a resource in generating new work assignments. FIG. 3E describes a change to the process of FIG. 3D, wherein the sequence of operations for the workstations have been adjusted, and work element K, originally split between workstations 20B and 20C, has been redistributed to compensate for a malfunction on workstation 20C. Workstation 20D, originally idle, has been activated with a human operator performing 20% of work element K or 40% of the work assignment originally assigned to workstation 20C. Workstation 20A, originally only performing work element J, has been tasked to perform 20% of work element K or 40% of the work assignment originally assigned to workstation 20C. Workstation 20B, originally performing 50% of work element K, has been tasked to perform an additional 10% of work element K or 20% of the work assignment originally assigned to workstation 20C. In this way, a malfunction in one of the workstations 20 may be compensated for, and production may continue with no or minimized impact on the overall production of the manufacturing line 15.

Figure 4:
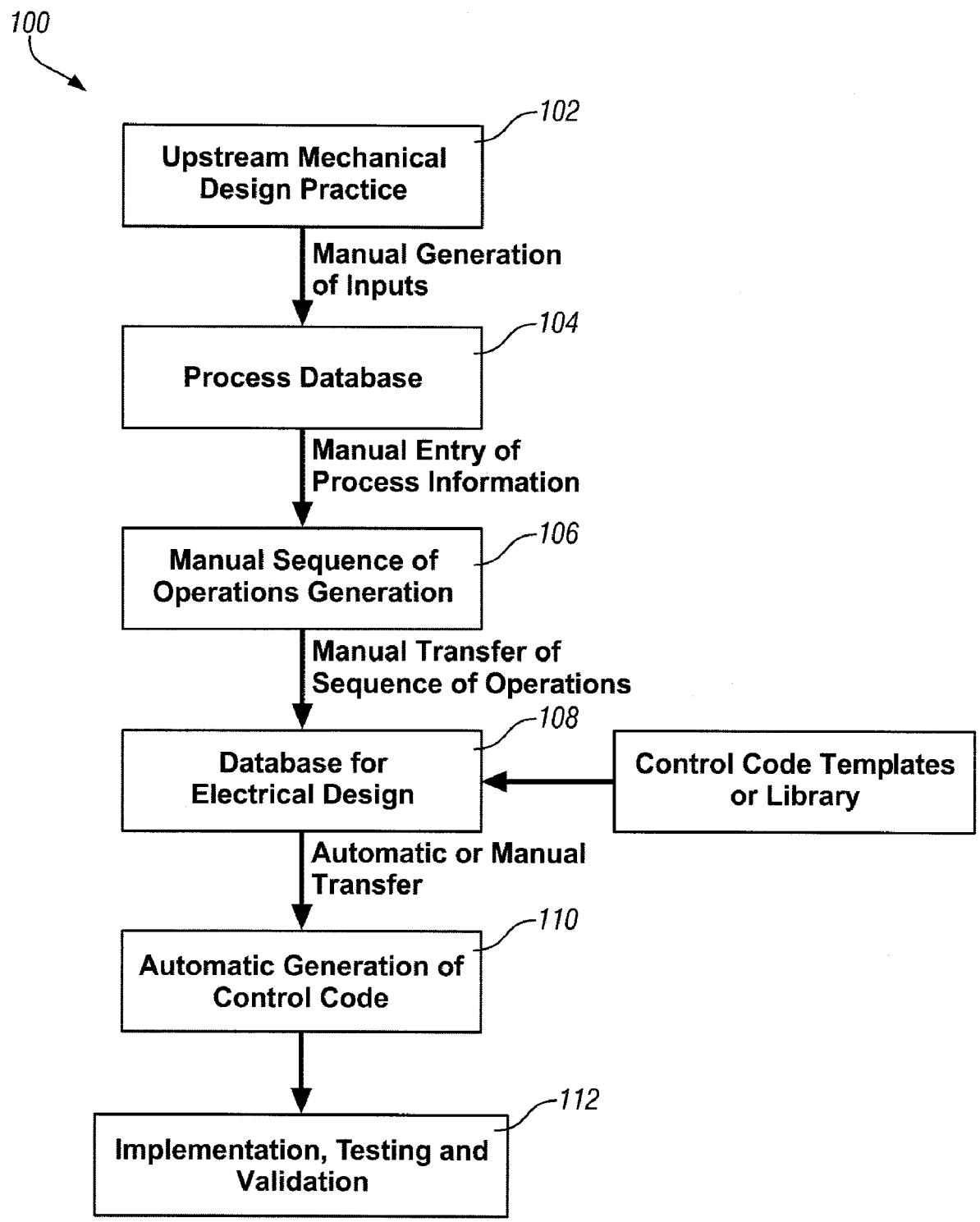
FIG. 4 is a flowchart illustrating a known method for generating a sequence of operations in accordance with the disclosure.

Methods are known for adapting a sequence of operations for changes in inputs from manufacturing line 15. FIG. 4 graphically depicts a known process 100 whereby inputs from a control engineer are utilized to generate manufacturing control logic. Inputs are generated at step 102 and may be related to both properties of the product being worked on and process performed by the workstations 20. The inputs from step 102 are manually gathered by the process engineer and for use in developing a sequence of operations. In this particular embodiment, the inputs are entered by the process engineer into a process database in step 104 as a means to store and manipulate the inputs into process information in a form necessary for generation of sequence of operations. Process information from step 104 may be used in a variety of methods to generate a sequence of operations. One known method is for the control engineer to study the particular equipment, study the manufacturing process, study the process flow, and manually generate a sequence of operations as depicted in step 106. Other known methods to generate a sequence of operations in step 106 include utilizing computer software commercially available to assist the engineer in managing and generating a sequence of operations for a given process. Sequence of operations generation requires detailed analysis of every step or work element of the manufacturing process, including cycle times for the equipment to perform its necessary task, manpower required for a given task, and other information related to the capabilities of each incremental work assignment. Rearranging each work assignment to be performed in workstations 20 embodied in the sequence of operations enables engineers to optimize the manufacturing process for throughput, efficiency, quality, and other important factors. The sequence of operations generated in step 106 is then manually fed in step 108 into a database for electrical design. During this manual entry, the engineer manually entering the information is responsible to correctly gather the information and use experience to ensure that the entered information is complete and in the correct format to correctly feed through later steps in the process. The information stored in the database in step 108 is combined with control code templates or library for the manufacturing processes in the involved workstations. This database is accessible to a control engineer or an automatic control logic generator which, in step 110, processes the sequence of operations and the control code templates, such as a PLC code library including hardware specific codes or routines, to generate workstation specific control code to operate the manufacturing process. Step 112 includes implementation, testing, and validation of the control logic and the results upon the product and process.

Known methods to generate sequence of operations, such as the process described above in FIG. 4, are labor intensive. The engineer must manually record inputs, correctly enter data from one step to another step, and exercise engineering judgment at each step to ensure that data units are converted correctly, decimal places are correctly maintained, operational characteristics of the manufacturing equipment is accounted for, and many other variables that require vigilant and competent work. The engineer must then calculate or develop a sequence of operations based upon the inputs and correctly transfer the sequence of operations to the control code generation step. Also, known methods cannot dynamically create a sequence of operations to compensate for an unforeseen or changing condition. If an event occurs for which no sequence of operations has been developed, known systems have no way to compensate for the change. Development of a sequence of operations for a complex manufacturing process using known methods may take a team of engineers months to complete. Engineering competency required to perform these tasks associated with the generation of a sequence of operations is frequently a matter of experience and lessons learned. Labor, experiments, trials, and other expenses related to the development process are also costly.

Figure 5:
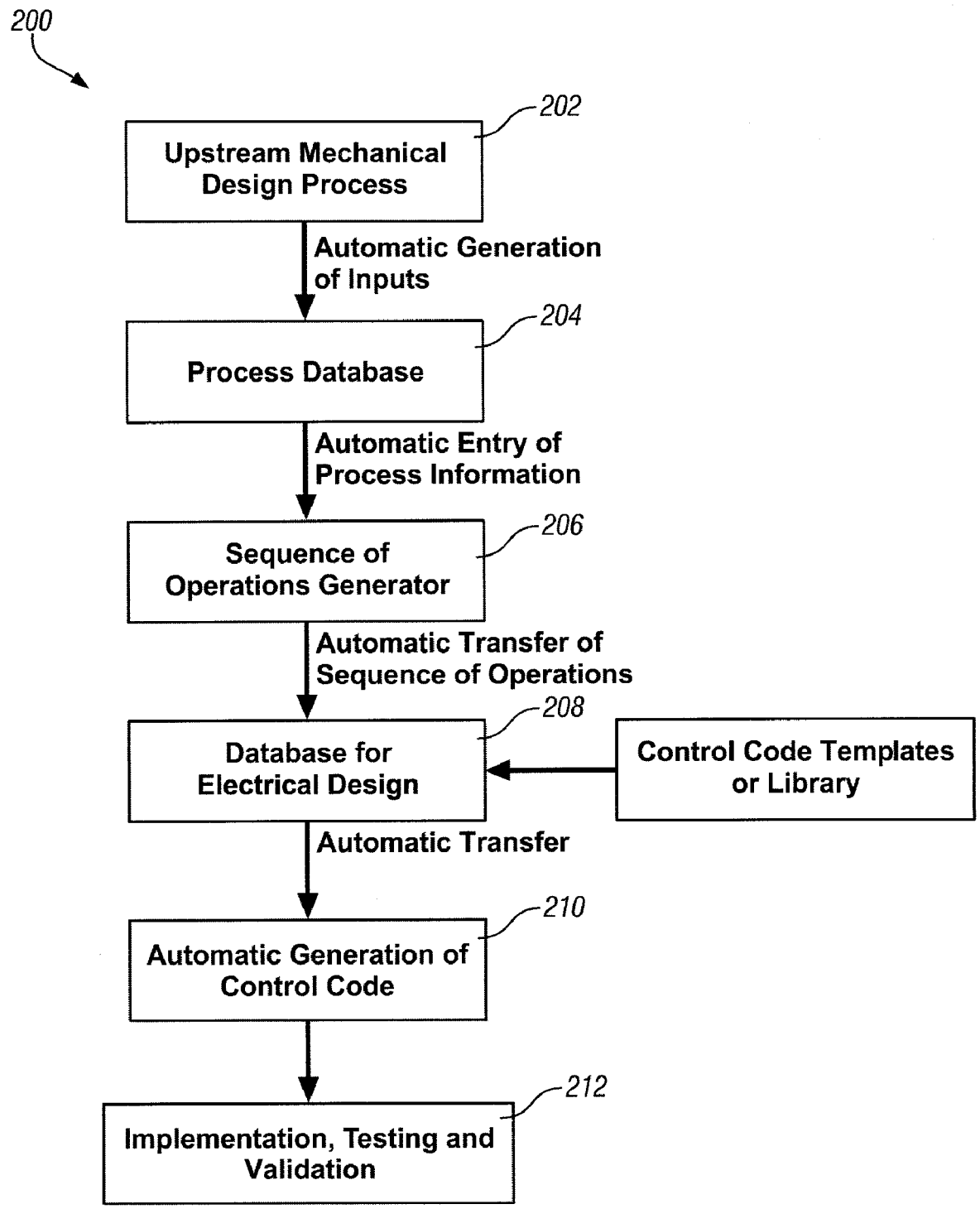
FIG. 5 is a flowchart illustrating an exemplary method to automatically generate a sequence of operations in accordance with the disclosure.

FIG. 5 illustrates an exemplary process 200 wherein manual entry and manipulation of data and manual calculation of a sequence of operations as utilized in exemplary process 100 are replaced by automatic steps operative to generate a sequence of operations in accordance with the disclosure. As mentioned above, manual entry of data through the process of generating a sequence of operations, calculating a sequence of operations, and entering the sequence of operations into the database for electrical design requires both vigilance to accuracy and engineering competency. However, the decision making process employed by engineers to analyze manufacturing work assignments and implement control code tends to be predictable and repeatable. Robotic equipment will drive to a particular result for a given input. Materials properties, such as the differences between aluminum and steel, are well known and predictable. Modern drafting software can track changes in various piece configurations and link these changes to a control program through techniques known in the art as computer aided manufacturing. These properties of predictability and repeatability make the decision making process involved in generating control logic potentially open to being modeled in an algorithm. The lessons learned by experienced engineers in relation to particular type of equipment in a manufacturing process may be captured in an algorithm operative to emulate engineering decisions. Advantages in time, cost, and quality may be derived from a system automating the process of generating a sequence of operations from information related to product and manufacturing process inputs. A method to automate the generation of sequence of operations may model the decision making process of the engineer utilized in steps 102 through 108 as depicted in FIG. 4.

Referring still to FIG. 5, process 200 is similar to known process 100 except that manual entry and transfer of data from one step to another is replaced with a method employing automatic data transfer and an automatic sequence of operations generator is employed in accordance with the disclosure. In process 100, steps 102 and 104 generated a group of inputs based upon product and process characteristics, and an engineer was responsible for gathering the data, converting the data into a useful group of inputs, and correctly entering the information into the process database. In process 200, these steps have been replaced by steps 202 and 204, wherein a computerized control module is in communication with both the upstream mechanical design elements and the process database. Inputs in the form of data regarding the product and manufacturing process being employed are generated in step 202. These inputs are then automatically transferred to the process database where they are stored in step 204. In order for the inputs to be stored in form that will be useful in later steps of process 200, some method must be employed to ensure clean inputs free from data irregularities are stored, simulating an engineer applying experience and judgment in the data entry method being replaced. Irregularities in the data may originate from many sources, including the data coming from multiple different types of workstations, data coming from workstations that were not originally intended to serve as data sources, and data dependent on human behavior. Many methods exist for allowing the correction of imperfect data. One exemplary method to ensure that clean inputs are stored in the process database at step 204 includes limiting the application of process 200 to workstations designed to interact with an automatic data collection method or simple automated units that can easily be configured to cooperate with an automatic data collection method. Another exemplary method to ensure that clean inputs are stored in the process database includes employing an algorithm within a computer either inline with or integral to the process database to analyze all inputs and make any necessary adjustments to the data. Such algorithms are well known in the art and are programmed with rules allowing the emulation of engineering judgment. Yet another exemplary method to ensure clean inputs includes employing an algorithm within a computer to analyze all data inputs and recommend any necessary adjustments to the data. These recommendations could be implemented by the algorithm and identified for later review by an engineer, visually displayed for an engineer for selection between alternatives, or ignored but identified for later audit.

Once inputs are stored in the process database in step 204, data in the form of process information is automatically transferred to a sequence of operations generator at step 206. The operation of the sequence of operations generator will be discussed in more detail below. Outputs from the sequence of operations generator are configured so as to be useful for later steps of process 200. The sequence of outputs generated at step 206 is then automatically transferred to a database for electrical design at step 208. As in process 100, the sequence of operations is combined with automation templates within the database for mechanical and electrical design, and this database is accessible to an automatic control logic generator. In step 210, the logic generator processes the sequence of operations and the control code templates to generate workstation specific control code to operate the manufacturing process. Step 212 includes implementation, testing, and validation of the control code, the sequence of operations, and the results upon the product and process. In this way, the collection of inputs, the subsequent generation of a sequence of operations, and the transference of the sequence of operations for the later generation of control code may be made automatic, avoiding the aforementioned drawbacks associated with methods dependent on manual data entry.

Figure 6:
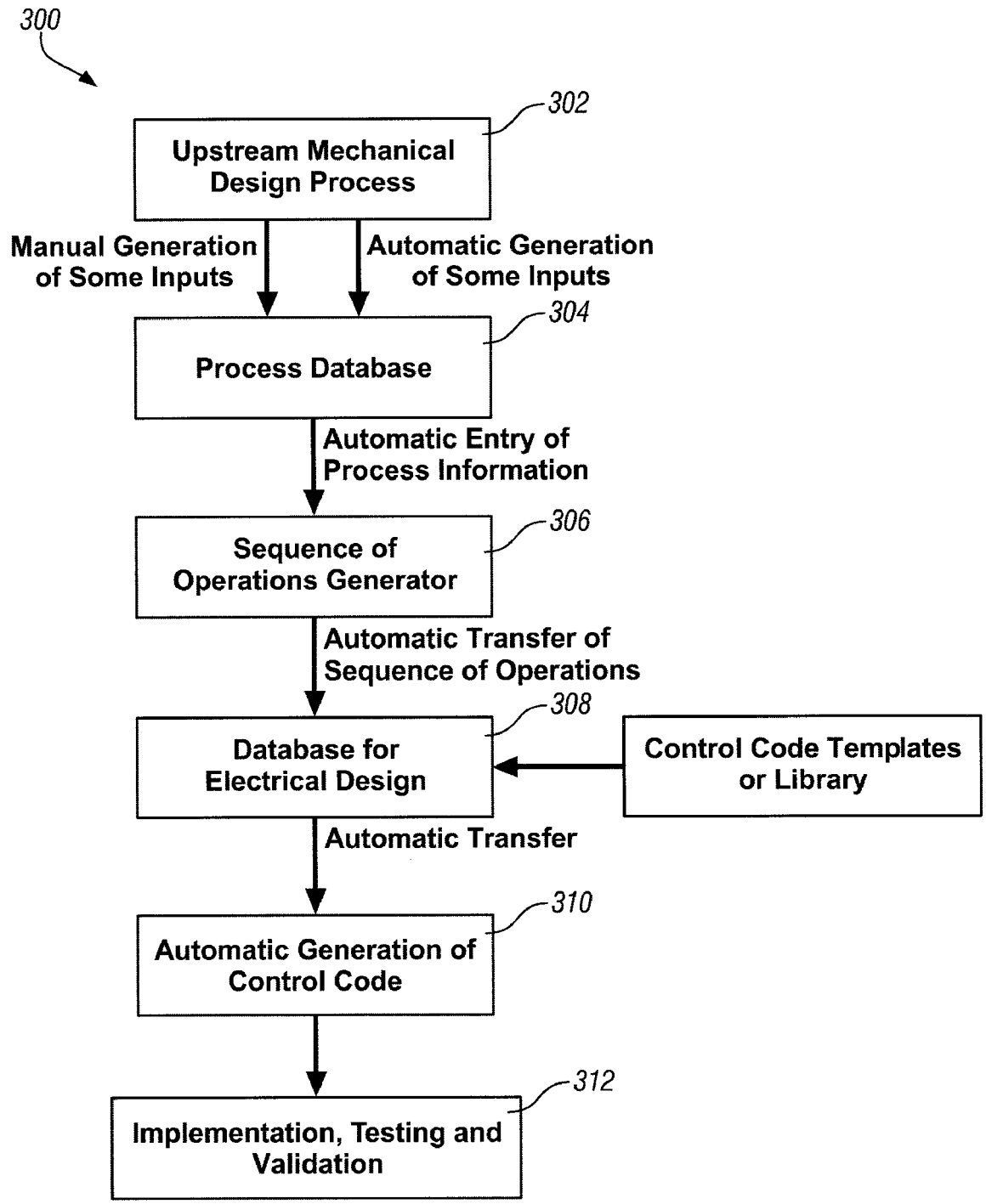
FIG. 6 is a flowchart illustrating an exemplary method to generate a sequence of operations with minimal human input in accordance with the disclosure.

FIG. 6 illustrates another exemplary process 300 wherein manual entry and manipulation of data as utilized in exemplary process 100 are replaced by automatic steps operative to generate a sequence of operations in accordance with the disclosure. Process 200, illustrated in FIG. 5, demonstrated a method whereby the manual collection, verification, entry, and later transference of data and process information were replaced with automatic steps. However, as noted above, data irregularities may hamper the automatic collection of data from the upstream mechanical design practice. The effects of data irregularities may be limited under certain simpler applications. However, as noted in FIGS. 2B and 2C, manufacturing processes may be quite complex, multiplying the difficulties associated with identifying and compensating for data irregularities. In addition, complex manufacturing facilities frequently employ a vast array of expensive legacy equipment or employ various manufacturing processes such as off-line builds that may not have outputs in a form that can be readily linked to an automatic data collection method. Process 300 is a hybrid method, combining the use of engineering judgment through the manual entry of some inputs from the upstream mechanical design process at steps 302 and 304, but continuing to use the automatic steps detailed in steps 202 through 208 of process 200 in steps 302 through 308 to remove delays and errors associated with human interaction present in process 100. Additionally, process 300 may still employ methods within the process database related to cleaning input data as discussed above related to process 200. Engineering judgment and experience may still be used to enter data not readily available, but the data may still then be analyzed and made consistent with other data inputs according to algorithms within the process database. For example, if a manufacturing process is set up, with data inputs reflecting a certain number of parts per hour, and a subsequent entry by an engineer reflects a data input at a parts per minute, an algorithm could be utilized to recognize and correct for the data irregularity that would result from this error. In another example how an algorithm could be used in conjunction with manually input data, if a manufacturing assembly line is set up at an initial time to produce 35 desired end products per hour, but later the line speed is changed to produce 40 desired end products per hour, algorithms may be employed to adjust for manually input data. For instance, if a cycle time for a particular brazing furnace is manually set and is identified during manual entry as being a set parameter, later speeding up of the overall process can adjust a sequence of operations, redistributing the allocation of resources for the potential bottleneck imposed by the set furnace cycle time. In another instance, if a cycle time for a conveyor belt is manually set and is identified during manual entry as being an adjustable parameter, later speeding up of the overall process may assume that the conveyor speeds up with the rest of the process, reflecting this flexibility in subsequent sequence of operations generated. Steps 304 through 312 apply the remainder of the automatic portions of the method described in steps 204 through 212 of process 200. By allowing manual input of data between steps 302 and 304 but still applying the other automatic methods of process 200, process 300 allows for implementation of methods described in this disclosure to improve cost, time, and quality of a desired end product under manufacturing facility circumstances that do not allow for automatic input collection.

Figure 7:
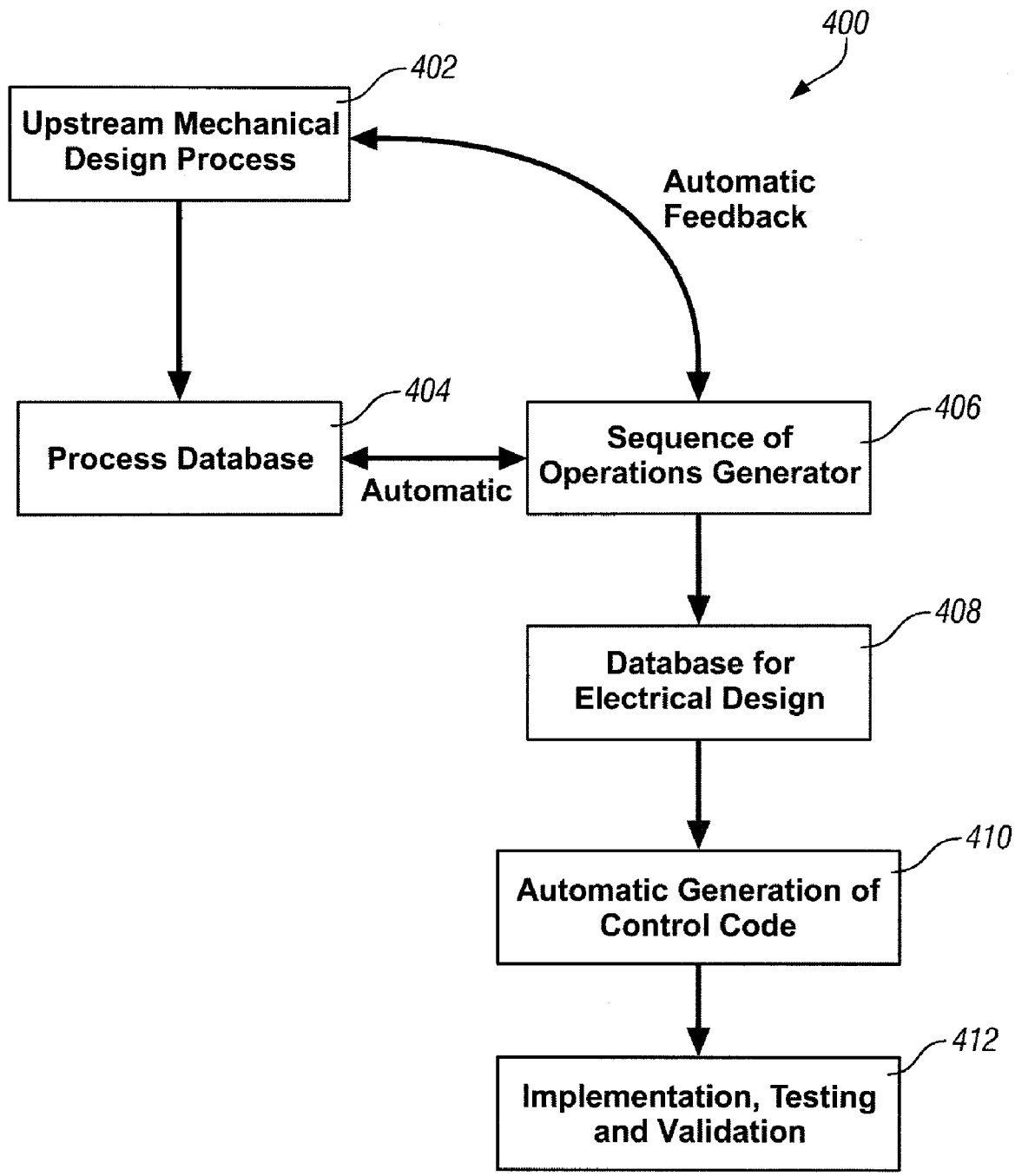
FIG. 7 is a flowchart illustrating an exemplary method to generate a sequence of operations, wherein the generation includes dynamic feedback to the manufacturing process in accordance with the disclosure.

Known methods to generate a sequence of operations such as those employed in process 100 are sequential processes wherein data is fed through the system, and at some points in the future after a control engineer completed the requisite work, a sequence of operations was calculated and control code was produced. Delay is inherent to the known method because the various steps that the data goes through are not integrated. Methods contemplated by this disclosure may be integrated, such that a computer, a control module, an emulation model, or a series of computers may almost instantaneously be able to evaluate the effects of changing product or process inputs on an entire manufacturing process. FIG. 7 illustrates an exemplary process 400 wherein direct feedback between the upstream mechanical design process and an automatic sequence of operations generator is enabled. This direct feedback allows current parameters or proposed changes in a manufacturing process to reflect probable results in the manufacturing process. Engineers can get immediate feedback regarding likely impacts of changes to the product or any piece of equipment. For instance, an automotive plant utilizing a control module collecting data from a thousand different workstations may evaluate the impacts of adding a new level of complexity to the desired end product. Bottlenecks associated with proposed changes can be identified. Interrelations between the resources available for each workstation may be tracked and balanced, and several alternative sequences of operations may be proposed and prioritized to implement a proposed change. Referring again to FIG. 7, step 402 generates inputs related to the product and the manufacturing process. These inputs are fed at step 404 to a process database, wherein process information is stored and compiled for use at step 406 in the automatic generation of a sequence of operations. This sequence of operations, including information related to the workstations and the resources required to complete all work assignments of the manufacturing process are fed back to the upstream mechanical design process. This fed back sequence of operations may be viewed manually for consideration or selection, or may be utilized automatically in the product or process decisions made in step 402. For example, a manufacturing process could be set up, wherein any delay created in a work assignment of the process, being evaluated in step 406, could be fed back and automatically initiate the use of a parallel process in step 402. Additionally, use of the feedback as a diagnostic tool can reduce the time, money, and resources required to evaluate a proposed change to the process. For instance, many manufacturing lines are designed to run virtually non-stop. Any delays in production, even one to evaluate potential improvements to the line process, may be inconvenient or expensive.

The feedback information made available from the algorithm within process 400 allow engineers to run virtual tests, making adjustments to work assignments and priorities in manufacturing concerns and evaluating their impacts to manufacturing line 15 without actually interrupting production. Another exemplary use of process 400 includes process monitoring capabilities. Process data including historical production results and workstation cycle times may be monitored, recorded, and cross-referenced to the sequence of operations that was being run at the time of the results. This process data may be analyzed and printed for evaluation. Another exemplary use of process 400 includes the monitoring of a manufacturing process for anomalous behavior. Process 400, as described above, may detect a changed condition in a piece of equipment or workstation, evaluate multiple sequences of operations, and automatically select a sequence of operations to compensate for the changed condition. The actions to compensate for the changed condition could include a visual, audio, or electronic indication to management, maintenance, engineering, or other personnel if there is an unexpected or unauthorized change in the manufacturing process. Many uses for feedback between the automatic sequence of operations generator and the upstream mechanical design process are envisioned, and this disclosure is not intended to be limited to the specific examples described herein. Further, the exemplary embodiments discussed above detail feedback in terms of the impact of upstream workstations or workstations proximate to work assignments contained within the given sequence of operations. Feedback may also be transmitted to downstream processes and may drive improvement in processes not directly contained but dependent upon the upstream workstations.

Figure 8:
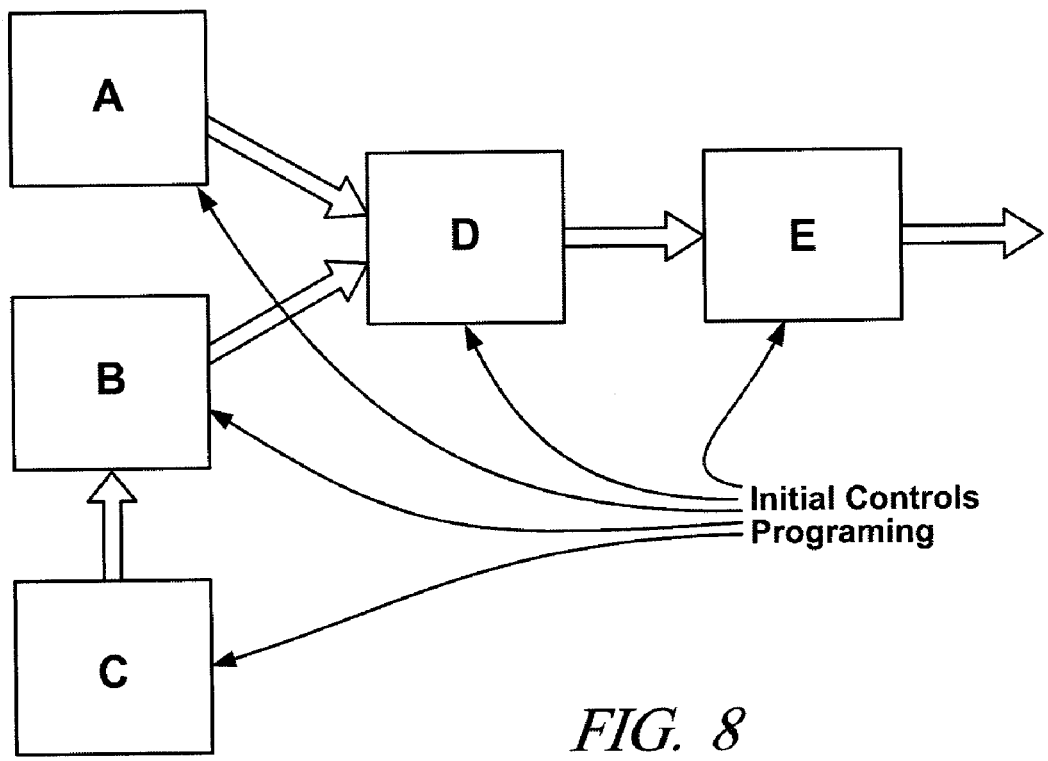
FIG. 8 is a block diagram illustrating a known method to implement initial control programming across several manufacturing areas in accordance with the disclosure.
Figure 9:
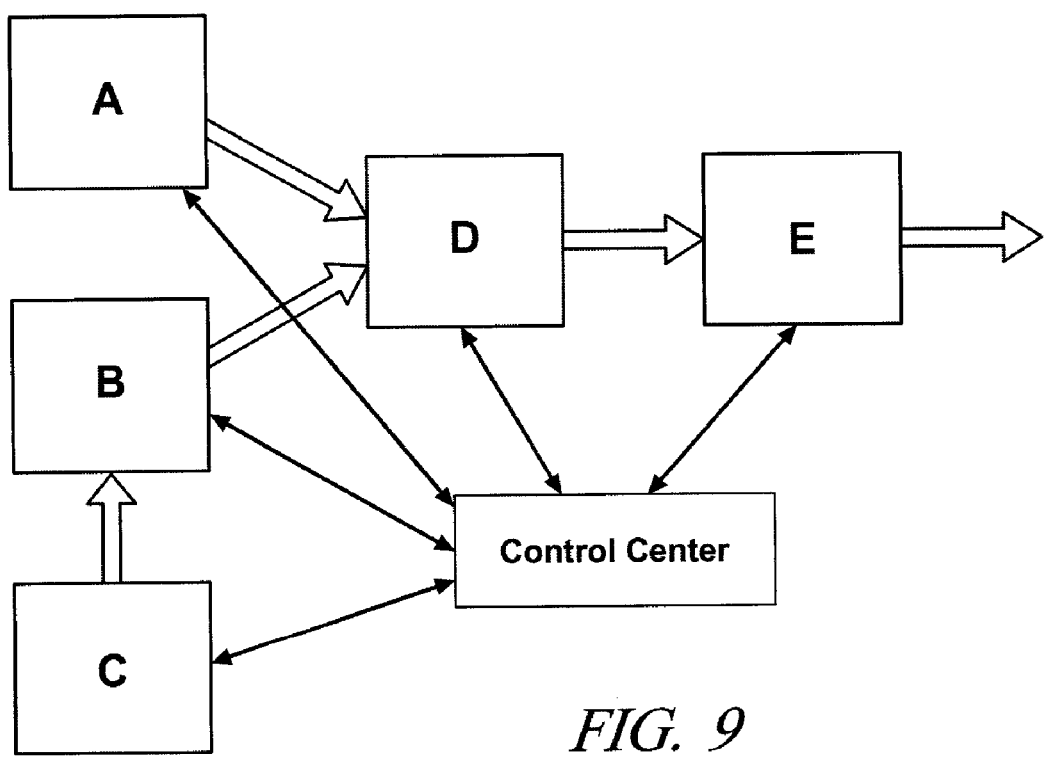
FIG. 9 is a block diagram illustrating an exemplary method to implement and monitor control programming across several manufacturing areas in accordance with the disclosure.

Another benefit of a control module 10 enabled with a feedback function is the ability to integrate an entire facility or multiple facilities with a common control center. FIG. 8. illustrates a known manufacturing facility receiving initial control programming operative to begin production in a plurality of operational areas. Five operational areas A through E are defined illustrating a product flow from one area to the next. At the start of the operation of the areas, control programming is entered to each area in processes similar to process 100, and the operation of the five areas is debugged until a satisfactory level of operation is achieved. Referring back to process 100 in FIG. 4, the flow of information from step 102 through to implementation in step 112 is unidirectional. Data is processed, a sequence of operations is calculated, and control code is generated and implemented. No mechanism exists for feeding back best practices or lessons learned. As a result, the sequence of operations and the resulting control logic for each area, with no feedback or unifying control, tends to develop independently, and costly lessons learned in one area must be repeated in each area. FIG. 9 illustrates the use of a control center in coordination with a plurality of operational areas, where the control center is operative to issue instructions to and receive feedback from the operational areas, in accordance with the disclosure. Process 400, illustrated in FIG. 7, contains a feedback mechanism and diagnostic capabilities as discussed above. The feeding back of this information is not limited to the local workstations, and a control center may be utilized either locally in the manufacturing facility or remotely over a communications network to perform various data analysis functions including analyzing trends in process data, comparing production rates across multiple manufacturing lines, and cross-referencing these trends and rates to sequences of operation for the various manufacturing lines. The control center could also be used in place of or in parallel with control module 10 to issue control commands to the workstations as described in the exemplary embodiments above. Referring back to FIG. 9, because the flow of data is enabled in two directions, the control center is not only operative to provide initial control programming to each of the operational areas, but also the control center is operative to monitor, adjust, analyze, and report on the operational areas, achieving all of the benefits described above across the operational areas. Additionally, the ability to unify all of the operational areas and combine the feedback from each area provides for a process known in the art as continuous improvement, whereby both process and results can be examined, and lessons learned can be shared between the operational areas.

Figure 10:
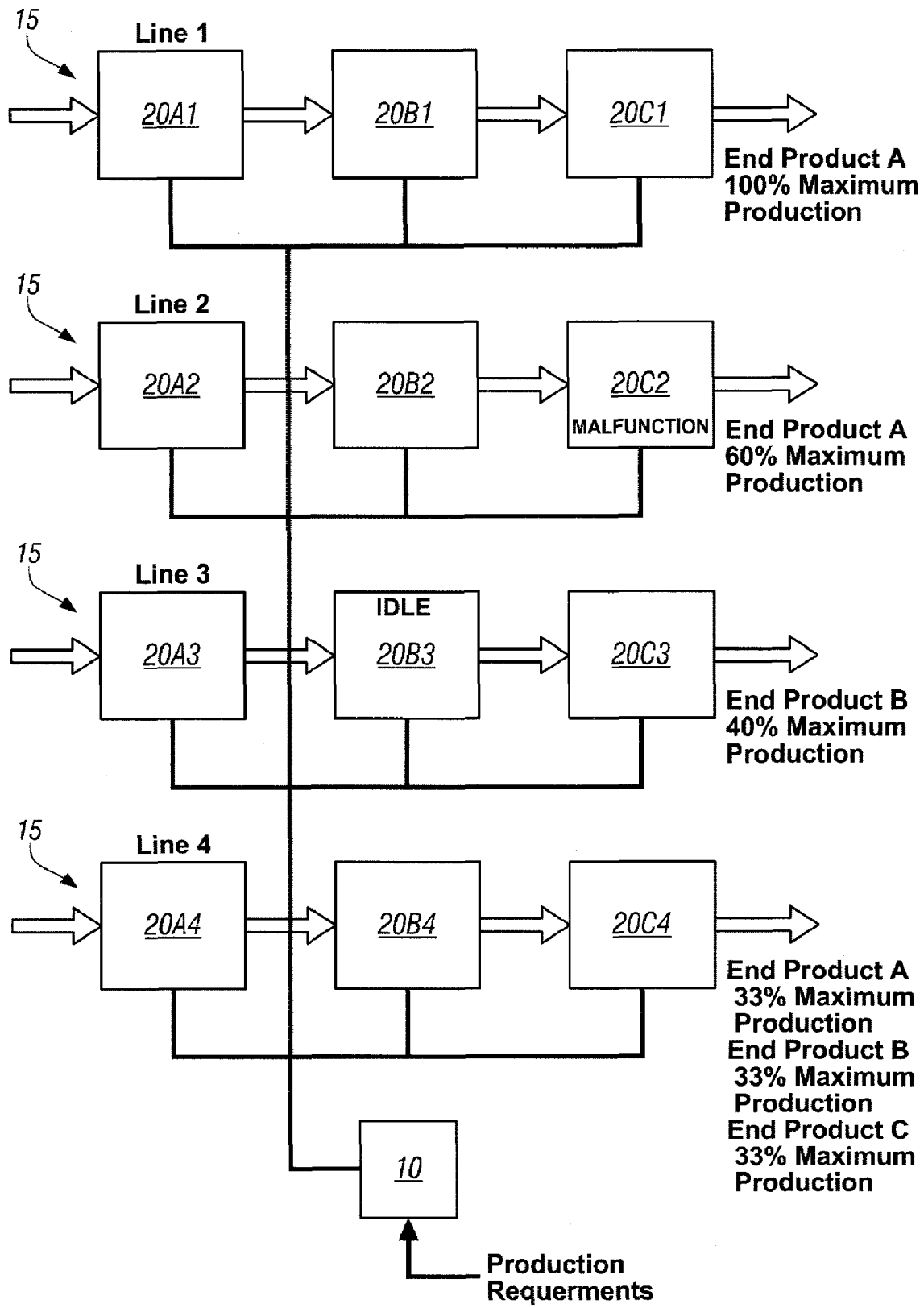
FIG. 10 is a block diagram illustrating an exemplary method whereby an automatic sequence of operations generator may be utilized to adjust or compensate equipment utilization levels across a number of manufacturing lines in accordance with the disclosure.

Feedback from multiple manufacturing lines or facilities can be used as described above in a diagnostic function, but feedback can also be used to coordinate the production requirements across multiple lines or facilities. For example, the processes described above enabling automatic generation of a sequence of operations based on changing inputs from the upstream mechanical design process such as described in process 400 can be used to dynamically adapt production of multiple manufacturing lines 15. FIG. 10 illustrates a control module 10 in communication with four manufacturing lines 15 in accordance with the disclosure. Manufacturing lines 15 are designated lines 1 through 4. For simplicity, each manufacturing line 15 in this exemplary embodiment is equipped with equivalent workstations 20A, 20B, and 20C; however, the equipment and capabilities of the lines need not be equivalent and are not meant to be limited in this way. Equivalent workstations 20A, 20B, and 20C in each manufacturing line are capable of producing a set of end products A, B, and C. Control module 10 is fed a set of production requirements, and the requirements are allocated to the various manufacturing lines 15 in order to produce end products A, B, and C based upon the capabilities of the lines. In the exemplary embodiment of FIG. 4, workstation 20C2 has a malfunction. As a result, the work assignment of workstation 20C2 has been redistributed to workstations 20A2 and 20B2, and the production requirements of line 2 have accordingly been reduced. Additionally, the full capacity of lines 1 through 4 in this exemplary embodiment are not required, and, as a result, workstation 20B3 of line 3 has been idled, and the production requirement of line 3 has been accordingly reduced. Such an idling of a workstation may save money in the operation of the line by allowing the resources used to run that workstation to be conserved, for example, by using the human operator usually at that workstation to work elsewhere in the facility. In the event of unforeseen conditions or changes in production requirements, control module 10 can reevaluate the production requirements of each manufacturing line 15 and the work assignments of each workstation 20 and adjust the sequence of operations accordingly. For example, if a workstation on line 1 were to experience a malfunction, control module 10 could redistribute the work assignment from that workstation 20 to the other workstations on that line and then reallocate the lost production from line 1 to line 3, reactivating the idle workstation 20B3 to compensate for the added production requirements. In this way, module 10 equipped with methodology disclosed herein may adapt to compensate for unexpected conditions and changes in production requirements across a group of manufacturing lines 15.

Generation of a sequence of operations such as is performed in the above described exemplary processes, for example such as the generation described in step 206, first involves a reduction of a set of work assignments into a compilation of work elements describing the behaviors, cycletime, workload, and other requirements required to complete elemental tasks within the manufacturing process. The sequence of operations is then assembled, work element by work element, until a manufacturing process is detailed that performs every work assignment required to finish the desired end product. Optimization of a sequence of operations is a complicated endeavor, requiring a balancing of resources in order to budget time, money, throughput, quality, and various other factors. Engineering expertise is required to budget each of these resources and produce a desired end product that meets all of the manufacturer's requirements. While engineering experience is required in order to make the requisite decisions inherent to setting a sequence of operations, the decision making process is composed of numerous discreet comparisons. These comparisons are different for each manufacturing process, but these differences could be captured as a group of variables that could be integrated into a model of the decision making process. By reducing the generation of a sequence of operations to a computerized model, one can produce an algorithm effective to perform the nearly instantaneous generation of a sequence of operations from a given set of process information.

Various forms of reducing a decision making process to a computer model are known in the art. One type of method of particular application to the present disclosure is formal methods. Formal methods is a process known in the art where decision making such as the processes used to write software are reduced to mathematical analyses. A mathematical analysis under a formal method reconstructs the decisions made by an engineer through a series of algorithms to generate a predicted outcome had the engineer performed the same analysis. If correctly programmed, the mathematical analysis can then apply repeatedly the decision making pattern of the engineer to generate predictable results and drastically accelerate the decision making process. As discussed above, such a repeatable outcome can save time and money, and make the process less dependent on the particular engineer. Results can still be tested and validated by engineers, and the mathematical analysis may be updated and continuously improved.

Formal methods may be applied to the automated generation of sequence of operations. Information related to the product and the process being applied to the product lead to predictable constraints for control logic. For example, two parts being connected by a particular threaded fastener will require a particular driving torque, and a sheet of a particular alloy of steel at a given thickness will require a particular stamping force for a particular operation. Formal methods may be utilized to encode engineering expertise, known parameters and machine characteristics, receive inputs regarding particular applications, and generate outputs specifying operational instructions. These instructions may be prioritized and categorized by engineering principles and the requirements of a particular application and encoded in the formal methods, such that a sequence of operations may be generated. In this way, mathematical analyses are used to encode the decision making process utilized regarding control logic in a manufacturing process such that the process may be employed to automatically generate a sequence of operations.

Figure 11:
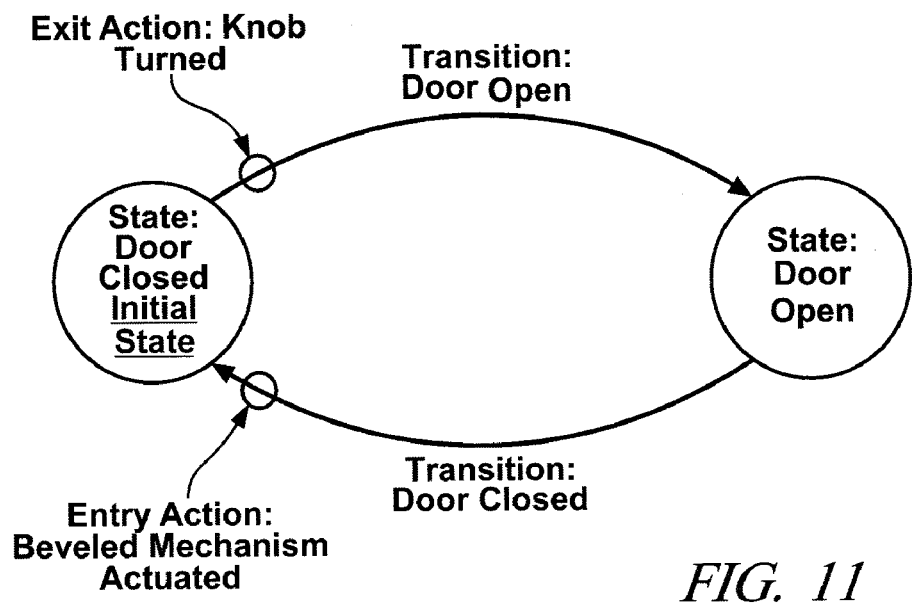
FIG. 11 is a flowchart illustrating the operation of a sample finite state machine in accordance with the disclosure.

Various forms of formal methods exist. One exemplary form of formal methods is embodied in finite state machines. Finite state machines are well known in the art and will not be described in detail herein. However, relative to the present disclosure, finite state machines essentially describe systems which can at all times be described by a state in which they exist. Finite state machines are also known as finite automata which describe system behavior. Automata can be initially entered and revised according to test results to embody the behaviors of various properties within a complex system being modeled. These automata, modeling particular system characteristics, accept inputs and generate indications of system states. An initial state is defined, and a set of transitions from that state to other states are set. As inputs indicate a condition for a particular transition is met, the system is said to transition from the initial state to a new state. Each state may have entry actions which occur whenever the state is entered and exit actions which occur whenever the state is exited. An exemplary finite state machine is depicted in FIG. 11 in accordance with the disclosure. The system being modeled is a door which may exit in two states: the door may be closed, or the door may be open. A door may be modeled by a finite state machine because it has a finite number of states in which it may be described: open and closed; and the transition between the states may be easily defined. Within the finite state model, an initial state is defined, such that the door is initially closed. One transition is named for the door closed state: when the door opens, the system will transition to the door open state. Likewise, one transition is named for the door open state: when the door closes, the system will transition to the door closed state. An entry condition exists for the door closed state, such that whenever the door transitions to the door closed state, the beveled latch mechanism in the door knob is activated. An exit condition also exists for the door closed state, such that whenever a closed door experiences a door opens transition, the door knob is turned. In this way, a finite state machine may be used to describe the behavior of a system exiting in a finite set of states.

Figure 12:
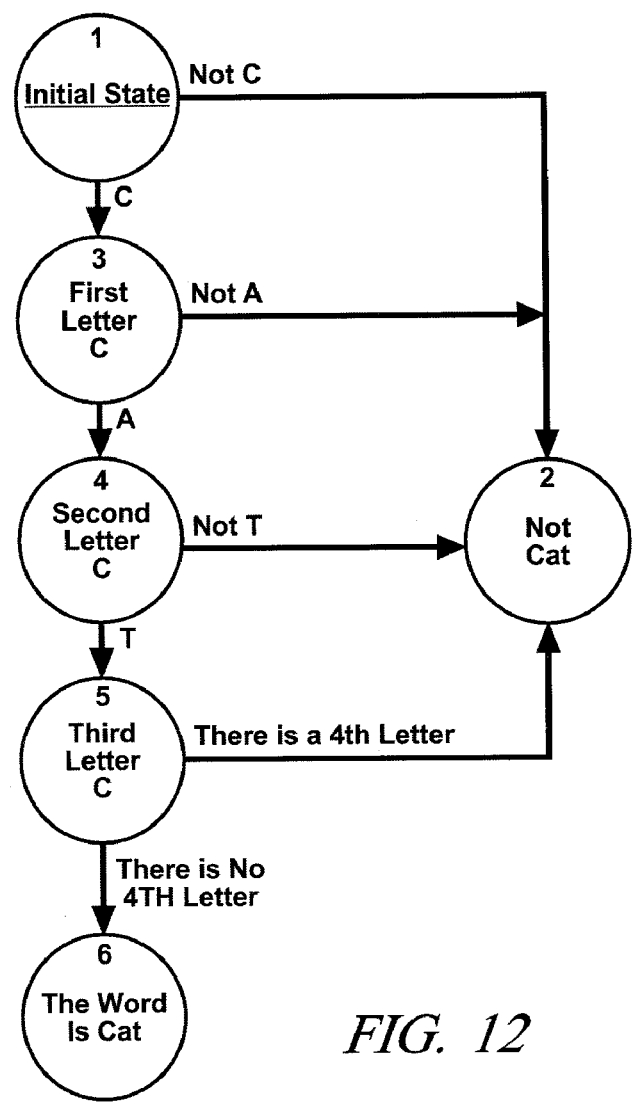
FIG. 12 is a flowchart illustrating the operation of another sample finite state machine in accordance with the disclosure.

The operation of another exemplary finite state machine is shown in FIG. 12 which graphically depicts an exemplary finite state machine utilized to classify an input in accordance with the disclosure. FIG. 12 illustrates an embodiment of a finite state machine determining whether an input word is the word cat. The existence of a letter in a particular order in the word is the state of the system, and the identification of the letter in the order comprises the identified set of transitions. State one is defined as the initial state. Two transitions from state one exist: the first letter is C, and the first letter is not C. The transition for the first letter is C transitions the system to state three, a state in which the first letter is C. The transition for the first letter is not C transitions to state two, a state in which the word is not cat. Two transitions from state three exist: the second letter is A, and the second letter is not A. The transition for the first letter is A transitions the system to state four, a state in which the second letter is A. The transition for the second letter is not A transitions to state two. Two transitions from state four exist: the third letter is T, and the third letter is not T. The transition for the third letter is T transitions the system to state five, a state in which the third letter is T. The transition for the third letter is not T transitions to state two. Two transitions from state five exist: there is no fourth letter, and there is a fourth letter. The transition for there is no fourth letter transitions the system to state six, a state in which the word is cat. The transition for there is a fourth letter transitions to state two. In this way, a finite state machine may be used to discriminate an input to determine whether the system being modeled fits a particular description.

The above exemplary embodiments of finite state machines may be utilized in a wide variety of ways to describe the work elements involved in a manufacturing process. Finite state machines such as the simple example discussed in FIG. 12 may be modified, for example, to describe the operations of a robot fastening screws to a product. Process steps may be modeled similarly in defined states: a clamp may be open or closed; a screw boss may be empty or fastened; a pallet station may open or full. A state could be defined for each screw being driven onto the product currently in the workstation, and transitions could be defined for the process of driving each screw. Alternatively, states could be defined for each motion of the robot, with state one being the robot in the home position, state two being the robot in the home position with a screw fed into the drive position, state three being the robot arm moving over screw boss number one, etc. The manner in which the processes are divided into states for purposes of utilizing a finite state machine may take many forms and are not intended to be limited to the specific examples described herein. It will be appreciated by those having ordinary skill in the art that actions in discrete manufacturing processes are composed of any number of elemental steps. These elemental steps in isolation or in groups which are logically grouped together form binary events which may be described as in terms of not yet done and done. In this way, finite state machines may be created to model the numerous steps involved in a manufacturing process.

Once a finite state machine and its automata are established, the realm of possible states within the finite state machine must be identified. The output of the various automata are accepted and may in an optional process be optimized before being applied to the finite state machine in a process known as pre-optimization. Pre-optimization may condition the output of the automata, applying priorities or lessons learned through audits of the finite state machine in order to fine-tune the performance of the overall finite state machine. In a process known as prioritized synchronous composition, the output of the automata and associated possible states, existing as mathematical equations, are cataloged or compiled, and a list of all possible states in the model are grouped into a complete solution state set. The number of possible states increases exponentially for every option modeled in the system, so the list of possible states must be reduced to a group of states which most likely produce a viable solution to the finite state machine so that it is solvable with commodity computation hardware. A trim algorithm may be used to perform a state space reduction. The trim algorithm searches the complete solution state set, applies rules and priorities to the complete solution state set, and analyzes the relationships of one state to another and the resulting possible finite state machine solutions that are most likely for a given relationship. The complete solution state set is then reduced to a conforming state solution set. In a process known as language extraction, the conforming state solution set is compiled, and a list of probable finite state machine solutions are defined. Recalling that the finite state machine is a mathematical representation of the system modeled by the various automata, the list of probable finite state machine solutions generated in the language extraction process exists solely as a set of mathematical expressions. These mathematical expressions must be translated into a useful set of information through a translation algorithm. Once translated, the output of the translation algorithm provides a descriptive state set and associated transitions between the states possible to solve the finite state machine. The descriptive state set and associated transitions are then prioritized or optimized according the known preferences and system priorities in order to create a useful set of predictive system states or instructions to select from. In this way, a system may be modeled through a finite state machine, the finite state machine accepting inputs related to the operation of the system and generating a predictive list of probable behaviors of the system.

Figure 13:
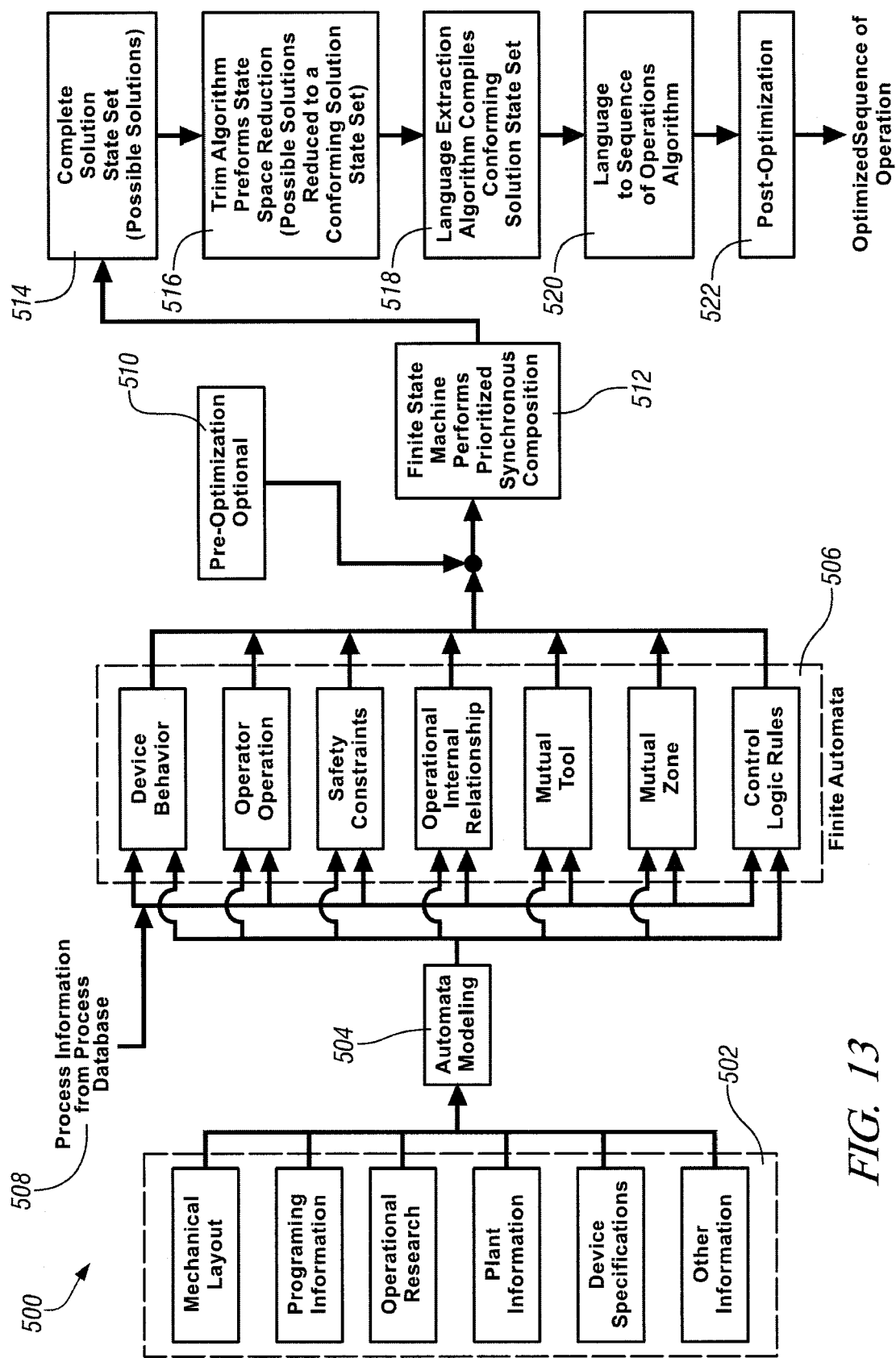
FIG. 13 is a flowchart illustrating an exemplary utilization of a finite state machine to generate an optimized sequence of operations for a manufacturing process in accordance with the disclosure.

FIG. 13 illustrates the operation of a finite state machine utilized to automatically generate a sequence of operations in accordance with the disclosure. The process employed to utilize the finite state machine to model manufacturing process related information and generate a sequence of operations is defined as process 500. In step 502, engineers gather information related to the manufacturing process being modeled, including information related to the mechanical layout of the manufacturing facilities involved including detailed information regarding the machinery and workstations to be implemented, information related to the process to be implemented and the necessary steps to be taken particular to the products being produced, operational research performed by the engineers including particular rules and relationships in the manufacturing process that must be observed, plant information including necessary constraints imposed by the plant layout, and device specifications including communications standards and protocols which will allow the various workstations and machinery to communicate with the control module. In step 504, the engineers utilize the information gathered in step 502 to model various automata, which together as a set must accurately encompass the behavior of the manufacturing process. These automata include but are not limited to particular devices or machinery behavior to be utilized in every workstation, information related to any human operators utilized in the manufacturing process, constraints protecting the human operators involved in the process, operational internal relationships defining resources inherent to the system or necessary to the production process, mutual tool definitions describing any mechanical resources shared between workstations, mutual zone definitions describing any area resources shared between workstations or within a workstation, and control logic rules defining operational restraints and behaviors of workstations affecting the instructions which may be issued to those workstations. These automata created in step 504 are utilized in step 506 in conjunction with process information received from the process database in step 508 to generate mathematical representations of the behavior of the manufacturing process. The mathematical representations generated in step 506 include details for every work task defined in the manufacturing process and the resources required to perform each work task. As described above, pre-optimization may be optionally performed on the outputs of the automata at step 510. The mathematical representations contained in the automata outputs are put through the prioritized synchronous composition process in step 512, and in step 514 a complete solution state set describing every possible combination in the manufacturing process is generated. The complete solution state set is then put through a trim algorithm in step 516, and the set of states to be potentially utilized in the eventual finite state machine solution is reduced to a conforming state solution set. At step 518, a language extraction algorithm is applied, and the conforming solution state set generated in step 516 is compiled for a list of conforming solutions to the finite state machine. These conforming solutions are processed through a language to sequence of operations algorithm in step 518, translating the mathematical list of conforming solutions into a list of potential sequences of operations. This list of potential sequences of operations are post-optimized in step 522 in order to generate either an optimized sequence of operations or a prioritized list of sequences of operations for selection. In this way, a finite state machine may be utilized to accept process information from a manufacturing process to generate a sequence of operations operable to generate control logic for the manufacturing process.

Figure 14:
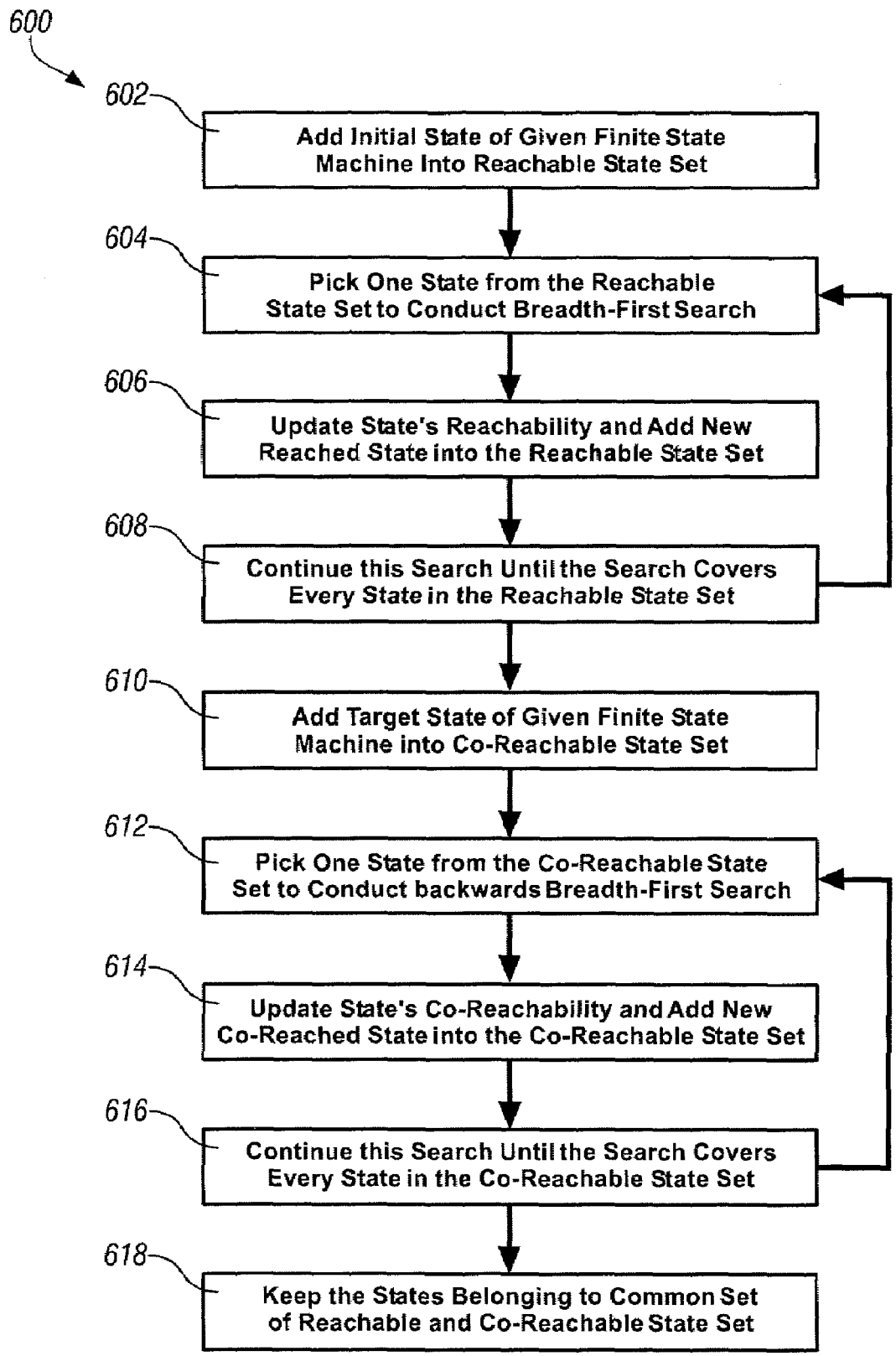
FIG. 14 is a flowchart illustrating an exemplary utilization of a trim algorithm to perform a state space reduction in accordance with the disclosure.

The form of the trim algorithm utilized in the finite state machine may take many forms. The operational process of an exemplary embodiment of the trim algorithm is illustrated in FIG. 14 in accordance with the disclosure. The process illustrated utilizes multiple iterations of a search strategy known in the art as a breadth-first search to define from the complete solution state set a reachable state set. Starting from a defined initial state, the algorithm uses a breadth-first search to define every state reachable from the initial state, and any states directly reachable from the initial state are included in the reachable state set. This relationship of the initial state to the identified reachable states is identified and recorded. Each of the states now included in the reachable state set are then searched in steps 604 and 606, relationships of each of the states reachable from the initial state to additional states directly reachable therefrom are additionally identified and recorded, and the process is reiterated at step 608 until every state is included in the reachable state set. At the conclusion of step 608, an outline of reachable relationships starting with the initial state of all possible transitions through the all states is available. Any combinations of states which are not reachable from each other are trimmed from the complete solution state set. The process is then repeated from the terminal or target states in the process, at step 610, identifying a target state and defining a co-reachable state set comprising all states directly reachable from the target state. The process is repeated in steps 612 and 614 from all of the newly identified state in the co-reachable state set, and all states directly co-reachable therefrom are identified and recorded in the co-reachable state set. The process is repeated in step 616 until every state is included in the co-reachable state sets. At the conclusion of step 616, an outline of co-reachable relationships starting with the target state of all possible transitions backwards through the all states is available. Any combinations of states which are not co-reachable from each other are trimmed from the complete solution state set. Through the trimming of the reachable state set and the co-reachable state set, any states not directly reachable from each other and not conducive to a target state are trimmed from the complete solution state set to create the conforming solution state set. In this way, the complete solution state set, a definition of every state possible within a system, is reduced and mapped to a series of state-transition relationships available for the finite state machine solution.

Figure 15:
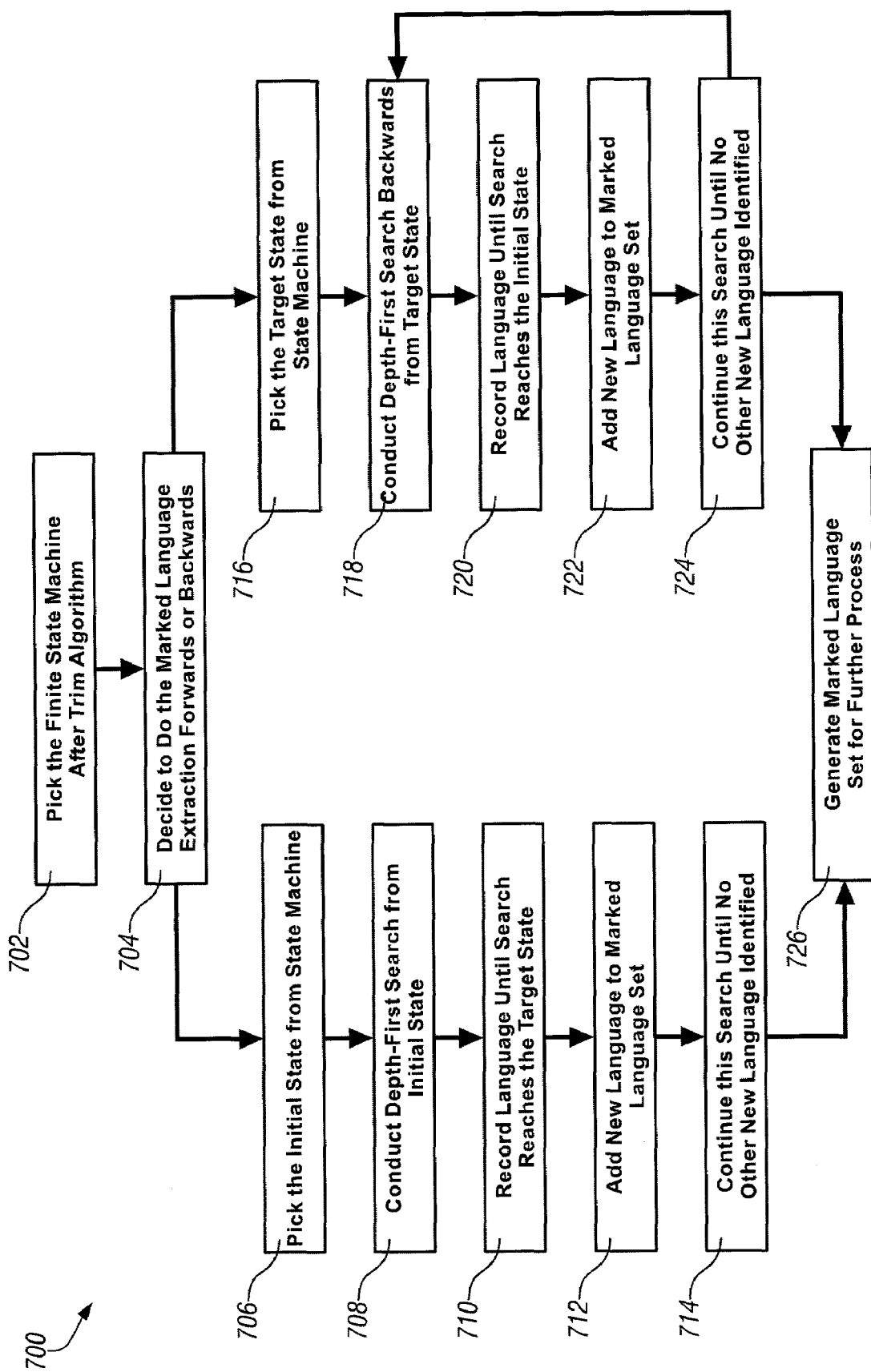
FIG. 15 is a flowchart illustrating an exemplary utilization of a language extraction algorithm in accordance with the disclosure.

The form of the language extraction algorithm utilized in the finite state machine may take many forms. The operational process of an exemplary embodiment of the language extraction algorithm is illustrated in FIG. 15 in accordance with the disclosure. This exemplary process of language extraction is defined as process 700. Output of the conforming solution state set from the trim algorithm is input at step 702. Step 704 includes a decision whether to perform language extraction starting at the initial state or the target states. Testing has shown performing language extraction in either direction to be equally valid. Steps 706 through 714 are utilized if the decision at step 704 is to start the language extraction with the initial state. At step 706, the initial state is identified. Step 708 includes a search method known in the art as a depth-first search which, starting with the initial state, explores possible routes from one state to the next in steps 710 through 714, identifying possible paths from the initial state to the target states. The analysis performs searches through paths in succession, reiterating searches at each state where multiple transitions are identified, until every state and every transition is mapped. Each time that a path from the initial state to a target state is identified, the path tree or language involved in that path is identified or marked. All marked languages are identified and recorded in a marked language set. Steps 716 through 724 are utilized if the decision at step 714 is to start the language extraction with target states. At step 716, target states are identified. Step 718 includes a backwards depth-first search which, starting with a target state, explores possible routes from one state to the next in steps 720 through 724, identifying possible paths from targets states back to the initial state. The analysis performs searches through paths in succession, reiterating searches at each state where multiple transitions are identified, until every state and every transition is mapped. Each time that a path from the initial state to a target state is identified, the path tree or language involved in that path is identified or marked. All marked languages are identified and recorded in a marked language set. In this way, the language extraction algorithm identifies potential solutions in the finite state machine which indicate state-transition relationships that lead from the initial state to target states. These potential solutions, once translated into sequences of operations, represent sets of work assignments as viable processes to be implemented in the control logic.

Figure 16:
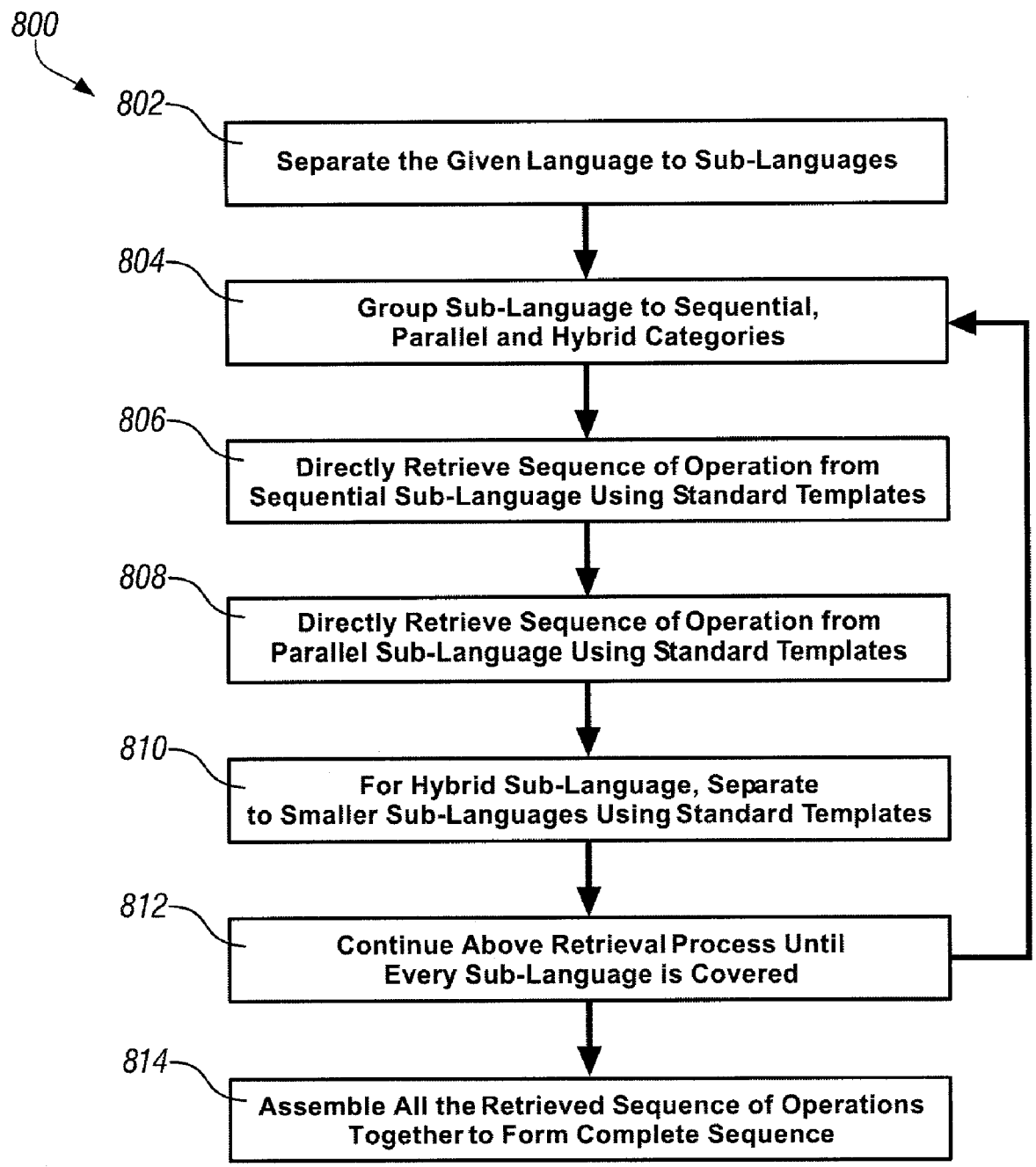
FIG. 16 is a flowchart illustrating an exemplary utilization of a language to sequence of operations algorithm in accordance with the disclosure.

The form of the language to sequence of operations algorithm utilized in the finite state machine may take many forms. The operational process of an exemplary embodiment of the language to sequence of operations algorithm is illustrated in FIG. 16 in accordance with the disclosure. This exemplary process of language to sequence of operations translation is defined as process 800. Potential solutions identified and recorded in the marked language set are input at step 802. Step 804 identifies each possible unique state-transition path solution to the finite state machine. Steps 806 through 810 identify different forms of paths known in the art designating solutions to the finite state machine and apply sequence of operations templates to translate the mathematical expressions contained in the paths to sequence of operations. Step 812 reiterates the process until every sub-marked language designating a solution is identified and translated. Step 814 assembles the list of sequences of operations into a list for output. As mentioned above, this list is later optimized and a sequence of operations is selected for implementation as control code.

Results from either the sequence of operations generation or the resulting control logic may be debugged, error-proofed, audited or otherwise validated by control engineers for possible improvement. The recordation and tracking abilities enabled by embodiments including feedback mechanisms allows for even greater scrutiny than known systems presently allow. In addition, the data utilized in the sequence of operations generator or in the feedback mechanism may allow for visual engineering or methods utilizing descriptive graphics to aid in the visualization of the parameters monitored in the manufacturing process. The data made available in the automatic generation of the sequence of operations may have many uses and are not intended to be limited to the embodiments described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for generating a control code set for a manufacturing process, comprising:

monitoring process information for a plurality of workstations of said manufacturing process, the process information comprising a cycle-time for each workstation;

generating a list of sequences of operations with an automatic sequence of operations generator based on said monitored process information;

selecting an optimized sequence of operations from said list of sequences of operations; and utilizing said optimized sequence of operations to generate said control code set;

wherein the sequences of operations comprises a plurality of work assignments to control the plurality of workstations of said manufacturing process.

2. The method of claim 1, wherein said selecting is performed automatically on the basis of programmed prioritized manufacturing concerns.

3. The method of claim 2, further comprising automatically monitoring inputs from said manufacturing process for use in said generating, and wherein said utilizing is performed automatically.

4. The method of claim 3, wherein said generating is operative to dynamically generate said list of sequences of operations in the event of an unforeseen condition.

5. The method of claim 1, further comprising automatically transferring a portion of said process information from equipment associated with said manufacturing process to said automatic sequence of operations generator.

6. The method of claim 5, wherein said transferring transfers an entirety of said process information from equipment associated with said manufacturing process to said automatic sequence of operations generator.

7. The method of claim 5, wherein said monitoring process information comprises monitoring required equipment utilization levels for said manufacturing process.

8. The method of claim 7, wherein said monitoring process information comprises monitoring data related to a plurality of unique products manufactured by said manufacturing process and wherein said generating of a list of sequences of operations dynamically determines a list of sequences of operations to meet said required equipment utilization levels.

9. The method of claim 8, wherein said generating a list of sequences of operations dynamically determines unique sequences of operations for a plurality of parallel manufacturing lines.

10. The method of claim 7, wherein said generating a list of sequences of operations idles individual work stations and dynamically rebalances work assignments in the event that said production levels are lower than a predetermined capacity of said manufacturing process.

11. The method of claim 1, wherein said monitoring process information comprises an input from an upstream mechanical design process and said method further comprises providing feedback from said automatic sequence of operations generator to said upstream mechanical design process.

12. The method of claim 11, wherein said providing feedback allows trials of experimental sequences of operations and said providing feedback comprises estimated production results for said manufacturing process.

13. The method of claim 11, wherein said providing feedback aids said selecting of said optimized sequence of operations.

14. The method of claim 11, wherein said providing feedback comprises indications to initiate warnings regarding unforeseen conditions.

15. The method of claim 11, wherein said providing feedback comprises operational data including actual production results correlated to a particular sequence of operations.

16. The method of claim 11, further comprising providing feedback from said automatic sequence of operations generator to a downstream mechanical design process.

17. A method for automatic generation of a control code set for a discrete manufacturing process in a motor vehicle manufacturing facility, comprising:

monitoring process information for a plurality of workstations of said manufacturing process, the process information comprising a cycle-time for each workstation;

transferring said process information to an automatic sequence of operations generator;

generating an optimized sequence of operations on the basis of said process information with said automatic sequence of operations generator; and utilizing said optimized sequence of operations to generate said control code set;

wherein said optimized sequence of operations comprises a plurality of work assignments to control the plurality of workstations of said manufacturing process.

18. An apparatus for automatic generation of a control code set for a manufacturing process, comprising:

a manufacturing line comprising an upstream mechanical design process monitoring process information for a plurality of workstations of said manufacturing process, the process information comprising a cycle-time for each workstation;

an automatic sequence of operations generator in communication with said upstream mechanical design process, said automatic sequence of operations generator generating an optimized sequence of operations on the basis of said process information; and a control code generator in communication with said automatic sequence of operations generator, said control code generator generating said control code set;

wherein said optimized sequence of operations comprises a plurality of work assignments to control the plurality of work instructions of a manufacturing process.

19. The apparatus of claim 18, wherein said automatic sequence of operations generator provides feedback to said upstream mechanical design process.

* * * * *